US012311416B2

United States Patent
Rodin et al.

(10) Patent No.: US 12,311,416 B2
(45) Date of Patent: May 27, 2025

(54) COGNITIVE CLEANING METHODS

(71) Applicant: Angara Industries Ltd., London (GB)

(72) Inventors: Ilya Yurievich Rodin, Moscow (RU); Eduard Cherednik, Zhodino (BY)

(73) Assignee: Angara Industries Ltd., London (GB)

(*) Notice: Subject to any disclaimer, the term of this patent is extended or adjusted under 35 U.S.C. 154(b) by 383 days.

(21) Appl. No.: 17/681,684

(22) Filed: Feb. 25, 2022

(65) Prior Publication Data

US 2022/0180329 A1 Jun. 9, 2022

Related U.S. Application Data

(63) Continuation of application No. PCT/RU2020/050205, filed on Aug. 26, 2020.

(30) Foreign Application Priority Data

Aug. 26, 2019 (RU) .................. 2019126815

(51) Int. Cl.
*B08B 7/00* (2006.01)
*B08B 3/10* (2006.01)

(52) U.S. Cl.
CPC .............. *B08B 7/0092* (2013.01); *B08B 3/10* (2013.01)

(58) Field of Classification Search
CPC ......... B08B 3/10; B08B 7/0092; C10G 75/04; C23G 1/00; C23G 1/08; C23G 1/19; C23G 3/04; C23G 5/00; C23G 5/02; F28G 15/003; G06Q 10/04; G06Q 10/06314; G06Q 10/20
See application file for complete search history.

(56) References Cited

U.S. PATENT DOCUMENTS

2005/0133211 A1* 6/2005 Osborn .................. F28F 19/00
165/157

FOREIGN PATENT DOCUMENTS

| CN | 1724965 A | 1/2006 |
|----|-----------|--------|
| CN | 105605965 A | 5/2016 |
| JP | 2007240133 A | 9/2007 |
| KR | 20100009357 A | 1/2010 |
| KR | 20180136651 A | 12/2018 |

(Continued)

OTHER PUBLICATIONS

Angara Industries LTD., International Search Report and Written Opinion, PCT/RU2020/050205, Dec. 24, 2020, 7 pgs.

(Continued)

*Primary Examiner* — Douglas Lee
(74) *Attorney, Agent, or Firm* — Morgan, Lewis & Bockius LLP

(57) ABSTRACT

Cleaning processing equipment may include generating a function characterizing a relationship between fouling formation in the processing equipment and operation of the processing equipment. A cleaning recipe may be selected based on properties of fouling material formed in the processing equipment during operation of the processing equipment. Operating costs associated with cleaning schedules may be determined based on the first function and the cleaning recipe and one of the cleaning schedules may be selected based on the respective determined operating costs. A cleaning process on the processing equipment may be executed according to the selected cleaning schedule using the selected cleaning recipe.

15 Claims, 12 Drawing Sheets

(56) References Cited

FOREIGN PATENT DOCUMENTS

| WO | WO-2004094319 A1 | * | 11/2004 | | B08B 17/00 |
| WO | WO-2014072085 A1 | * | 5/2014 | | G05B 17/02 |
| WO | WO 2021040575 A1 | | 3/2021 | | |

OTHER PUBLICATIONS

Angara Industries LTD., International Preliminary Report on Patentability, PCT/RU2020/050205, Mar. 1, 2022, 5 pgs.

Angara Industries LTD., Chinese Office Action, CN Patent Application No. 202080073608.0, Jul. 31, 2023, 6 pgs.

Angara Industries LTD., Extended European Search Report, EP Patent Application No. 20856263.7, Aug. 25, 2023, 8 pgs.

Mostafa Awad, "Fouling of Heat Transfer Surfaces", Chapter 20, In: Heat Transfer—Theoretical Analysis, Experimental Investigations and Industrial Systems, DOI: 10.5772/13696, Retrieved from the Internet: https://www.researchgate.net/publication/221910395_Fouling_of_Heat_Transfer_Surfaces, Jan. 2011, 39 pgs.

Thomas Pogiatzis et al., "Identifying Optimal Cleaning Cycles for Heat Exchangers Subject to Fouling and Ageing", Applied Energy, vol. 89, No. 1, DOI: 10.1016/j.apenergy.2011.01.063, Feb. 2011, 12 pgs.

Angara Industries Ltd., Singaporean Search Report, SG Patent Application No. 11202201794R, Sep. 19, 2023, 2 pgs.

Angara Industries Ltd., Singaporean Written Opinion, SG Patent Application No. 11202201794R, Oct. 3, 2023, 5 pgs.

Angara Industries Ltd., Singaporean Notice of Allowance, SG Patent Application No. 11202201794R, Oct. 29, 2024, 4 pgs.

Lin-lin Liu et al., "Synthesis of Heat Exchanger Networks Considering Fouling, Aging, and Cleaning", ACS Publications, Industrial & Engineering Chemistry Research, vol. 54, Issue 1, Dec. 2014, 11 pgs.

* cited by examiner

| 24 | | | | | 25 | | | | | 26 | | | | |
|---|---|---|---|---|---|---|---|---|---|---|---|---|---|---|
| Cold In | Hot Out | Cold Out | Hot In | LMTD | Cold In | Hot Out | Cold Out | Hot In | LMTD | Cold In | Hot Out | Cold Out | Hot In | LMTD |
| 202.56 | 207.64 | 203.56 | 221.68 | 10.26 | 203.56 | 221.68 | 216.34 | 250.37 | 25.28 | 216.34 | 250.37 | 253.41 | 328.43 | 51.91 |
| 205.40 | 210.35 | 207.66 | 224.25 | 9.62 | 207.66 | 224.25 | 220.34 | 252.67 | 23.59 | 220.34 | 252.67 | 256.24 | 330.00 | 50.23 |
| 203.81 | 210.80 | 208.09 | 224.62 | 9.63 | 208.09 | 224.62 | 220.93 | 252.87 | 23.39 | 220.93 | 252.87 | 257.30 | 329.74 | 49.46 |
| 196.42 | 202.82 | 198.90 | 217.49 | 11.29 | 198.90 | 217.49 | 212.88 | 247.88 | 25.94 | 212.88 | 247.88 | 252.47 | 330.58 | 53.71 |
| 199.52 | 204.28 | 201.98 | 219.36 | 9.75 | 201.98 | 219.36 | 215.83 | 250.20 | 24.92 | 215.83 | 250.20 | 255.04 | 334.11 | 53.68 |
| 198.55 | 204.42 | 201.07 | 219.27 | 10.90 | 201.07 | 219.27 | 215.27 | 249.64 | 25.43 | 215.27 | 249.64 | 255.47 | 332.23 | 52.77 |
| 195.93 | 201.53 | 198.54 | 216.83 | 10.73 | 198.54 | 216.83 | 213.25 | 248.19 | 25.74 | 213.25 | 248.19 | 254.92 | 333.46 | 53.83 |
| 194.23 | 199.10 | 196.82 | 214.98 | 10.10 | 196.82 | 214.98 | 211.38 | 247.43 | 26.09 | 211.38 | 247.43 | 252.64 | 335.73 | 56.33 |
| 207.17 | 209.05 | 209.31 | 223.06 | 5.97 | 209.31 | 223.06 | 221.35 | 251.71 | 20.97 | 221.35 | 251.71 | 255.46 | 329.66 | 49.06 |
| 191.47 | 197.62 | 194.24 | 212.63 | 11.17 | 194.24 | 212.63 | 209.84 | 243.30 | 25.18 | 209.84 | 243.30 | 254.04 | 326.78 | 50.59 |
| 185.46 | 196.17 | 188.50 | 212.85 | 16.29 | 188.50 | 212.85 | 203.58 | 244.54 | 30.61 | 203.58 | 244.54 | 253.95 | 332.92 | 56.65 |
| 191.49 | 199.48 | 194.22 | 215.21 | 13.46 | 194.22 | 215.21 | 209.54 | 247.36 | 28.59 | 209.54 | 247.36 | 252.94 | 329.64 | 49.85 |
| 190.64 | 199.30 | 193.41 | 214.99 | 14.16 | 193.41 | 214.99 | 209.03 | 247.07 | 29.04 | 209.03 | 247.07 | 253.26 | 326.34 | 50.59 |
| 190.90 | 198.87 | 193.64 | 214.67 | 13.46 | 193.64 | 214.67 | 209.01 | 246.98 | 28.67 | 209.01 | 246.98 | 252.56 | 334.89 | 56.87 |
| 196.68 | 204.86 | 199.33 | 220.20 | 13.56 | 199.33 | 220.20 | 214.24 | 251.54 | 28.30 | 214.24 | 251.54 | 256.47 | 334.34 | 57.32 |
| 193.33 | 201.33 | 196.04 | 216.78 | 13.39 | 196.04 | 216.78 | 211.42 | 248.36 | 28.07 | 211.42 | 248.36 | 254.98 | 334.89 | 56.09 |
| 193.59 | 200.85 | 196.30 | 216.60 | 12.69 | 196.30 | 216.60 | 211.63 | 248.80 | 27.89 | 211.63 | 248.80 | 255.03 | 336.79 | 55.47 |
| 193.39 | 201.48 | 196.09 | 217.15 | 13.56 | 196.09 | 217.15 | 211.29 | 249.19 | 28.66 | 211.29 | 249.19 | 254.35 | 334.39 | 56.43 |
| 193.71 | 202.53 | 196.42 | 217.98 | 14.26 | 196.42 | 217.98 | 211.70 | 249.58 | 28.96 | 211.70 | 249.58 | 254.97 | 336.33 | 57.14 |
| 194.37 | 202.43 | 197.04 | 217.68 | 13.38 | 197.04 | 217.68 | 212.08 | 248.86 | 27.94 | 212.08 | 248.86 | 254.66 | 335.95 | 56.57 |
| 195.22 | 202.52 | 197.85 | 218.57 | 13.58 | 197.85 | 218.57 | 212.89 | 249.35 | 27.93 | 212.89 | 249.35 | 254.73 | 333.70 | 55.25 |
| 195.37 | 203.52 | 197.85 | 220.38 | 12.33 | 201.02 | 220.38 | 215.91 | 251.38 | 26.73 | 215.91 | 251.38 | 258.09 | 333.10 | 54.90 |
| 197.80 | 206.11 | 201.02 | 222.08 | 13.56 | 200.42 | 222.08 | 215.12 | 251.68 | 27.85 | 215.12 | 251.68 | 256.73 | 335.17 | 53.61 |
| 183.82 | 185.98 | 188.78 | 211.78 | 15.72 | 188.78 | 211.78 | 205.42 | 244.03 | 30.16 | 205.42 | 244.03 | 252.53 | 334.93 | 56.62 |
| 188.91 | 198.22 | 191.82 | 213.84 | 14.77 | 191.82 | 213.84 | 208.18 | 245.76 | 29.11 | 208.18 | 245.76 | 254.53 | 331.98 | 55.39 |
| 188.03 | 197.51 | 190.94 | 213.28 | 15.01 | 190.94 | 213.28 | 207.36 | 245.52 | 29.55 | 207.36 | 245.52 | 253.85 | 333.24 | 56.28 |

| 15 HTC, kcal/ (m2*K) | 16 HTC, kcal/ (m2*K) | 17 HTC, kcal/ (m2*K) | 18 HTC, kcal/ (m2*K) | 19 HTC, kcal/ (m2*K) | 20 HTC, kcal/ (m2*K) | 21 HTC, kcal/ (m2*K) | 22 HTC, kcal/ (m2*K) | 24 HTC, kcal/ (m2*K) | 25 HTC, kcal/ (m2*K) | 26 HTC, kcal/ (m2*K) |
|---|---|---|---|---|---|---|---|---|---|---|
| 471.19 | 1 208.38 | 1 137.70 | 454.53 | 673.82 | 389.11 | 1 388.00 | 304.35 | 328.26 | 353.42 | 630.54 |
| 451.18 | 1 107.86 | 1 083.19 | 480.78 | 598.03 | 338.40 | 1 290.27 | 312.83 | 327.49 | 354.52 | 640.95 |
| 433.30 | 775.91 | 977.91 | 406.26 | 431.21 | 221.69 | 1 031.68 | 268.44 | 349.02 | 334.45 | 594.13 |
| 452.05 | 687.99 | 817.48 | 352.30 | 434.81 | 258.27 | 919.03 | 248.25 | 358.28 | 306.97 | 515.25 |
| 452.05 | 297.59 | 155.37 | 143.35 | 291.86 | 59.34 | 113.67 | 91.91 | 152.92 | 182.54 | 384.84 |
| 585.29 | 887.11 | 1 007.07 | 439.15 | 771.62 | 507.60 | 1 215.35 | 372.32 | 588.21 | 344.11 | 567.14 |
| 430.88 | 616.27 | 946.61 | 352.52 | 340.85 | 312.43 | 956.71 | 251.34 | 471.34 | 324.61 | 542.56 |
| 634.47 | 685.22 | 963.54 | 346.41 | 596.86 | 251.02 | 963.60 | 204.95 | 386.48 | 362.68 | 628.58 |
| 563.27 | 873.38 | 1 028.33 | 451.47 | 558.67 | 362.14 | 1 097.28 | 280.36 | 423.82 | 386.01 | 656.60 |
| 549.86 | 1 014.08 | 1 263.17 | 489.19 | 579.84 | 423.34 | 1 433.55 | 296.18 | 413.50 | 392.20 | 660.98 |
| 499.65 | 1 100.69 | 1 372.67 | 534.51 | 564.91 | 365.52 | 1 694.78 | 339.99 | 429.57 | 380.21 | 655.11 |
| 505.70 | 1 095.76 | 1 344.69 | 532.33 | 591.40 | 376.09 | 1 696.31 | 344.16 | 432.66 | 380.53 | 657.62 |
| 510.77 | 1 275.52 | 1 471.34 | 615.94 | 643.81 | 396.96 | 1 980.56 | 406.74 | 462.86 | 402.71 | 691.29 |
| 533.78 | 1 187.80 | 1 459.67 | 565.26 | 642.11 | 367.88 | 1 789.39 | 353.66 | 437.01 | 394.38 | 680.14 |
| 527.14 | 1 324.31 | 1 539.07 | 583.16 | 629.63 | 445.95 | 1 914.41 | 364.41 | 440.99 | 394.03 | 679.27 |
| 591.92 | 1 215.86 | 1 523.84 | 521.91 | 657.87 | 408.83 | 1 639.00 | 325.91 | 430.41 | 384.29 | 652.54 |
| 572.00 | 1 159.44 | 1 524.04 | 520.99 | 589.47 | 385.34 | 1 641.43 | 330.22 | 437.72 | 387.61 | 659.88 |
| 564.89 | 1 143.69 | 1 426.34 | 529.13 | 575.19 | 392.39 | 1 542.83 | 325.03 | 426.96 | 392.27 | 672.00 |
| 570.87 | 1 124.47 | 1 426.71 | 498.65 | 612.81 | 357.98 | 1 590.03 | 307.01 | 412.80 | 385.08 | 672.75 |
| 563.47 | 1 225.18 | 1 474.92 | 496.88 | 631.87 | 404.72 | 1 699.20 | 297.65 | 394.98 | 388.06 | 677.22 |

Figure 5

COGNITIVE CLEANING METHODS

CROSS-REFERENCE TO RELATED APPLICATIONS

This application is a continuation of PCT application PCT/RU2020/050205, filed Aug. 26, 2020, entitled "Cognitive Cleaning Methods," which claims priority to Russian national application 2019126815, filed Aug. 26, 2019, entitled "Cognitive Cleaning Methods," each of which is incorporated by reference herein in its entirety.

TECHNICAL FIELD

The present description relates generally to industrial processing and, more particularly to cognitive cleaning methods for industrial processing equipment.

BACKGROUND

Industrial processing such as crude oil refining, petrochemical production, power generation, etc., may involve the transport of hot and cold utilities (e.g., fluids, gases, liquids) through components such as heat exchangers in preheat trains. Over time and under various conditions, the transport of such utilities may result in fouling forming within the components. Fouling reduces the performance of the components such as increasing heat energy losses, which has a negative productivity impact as well as on overall negative economic and environmental impact on the industrial process.

BRIEF DESCRIPTION OF THE DRAWINGS

Certain features of the subject technology are set forth in the appended claims. However, for purpose of explanation, several aspects of the subject technology are set forth in the following figures.

FIG. 3 is a chart containing example temperature values measured and stored from inlets and outlets of a heat exchanger according to aspects of the subject technology.

Figure 4:
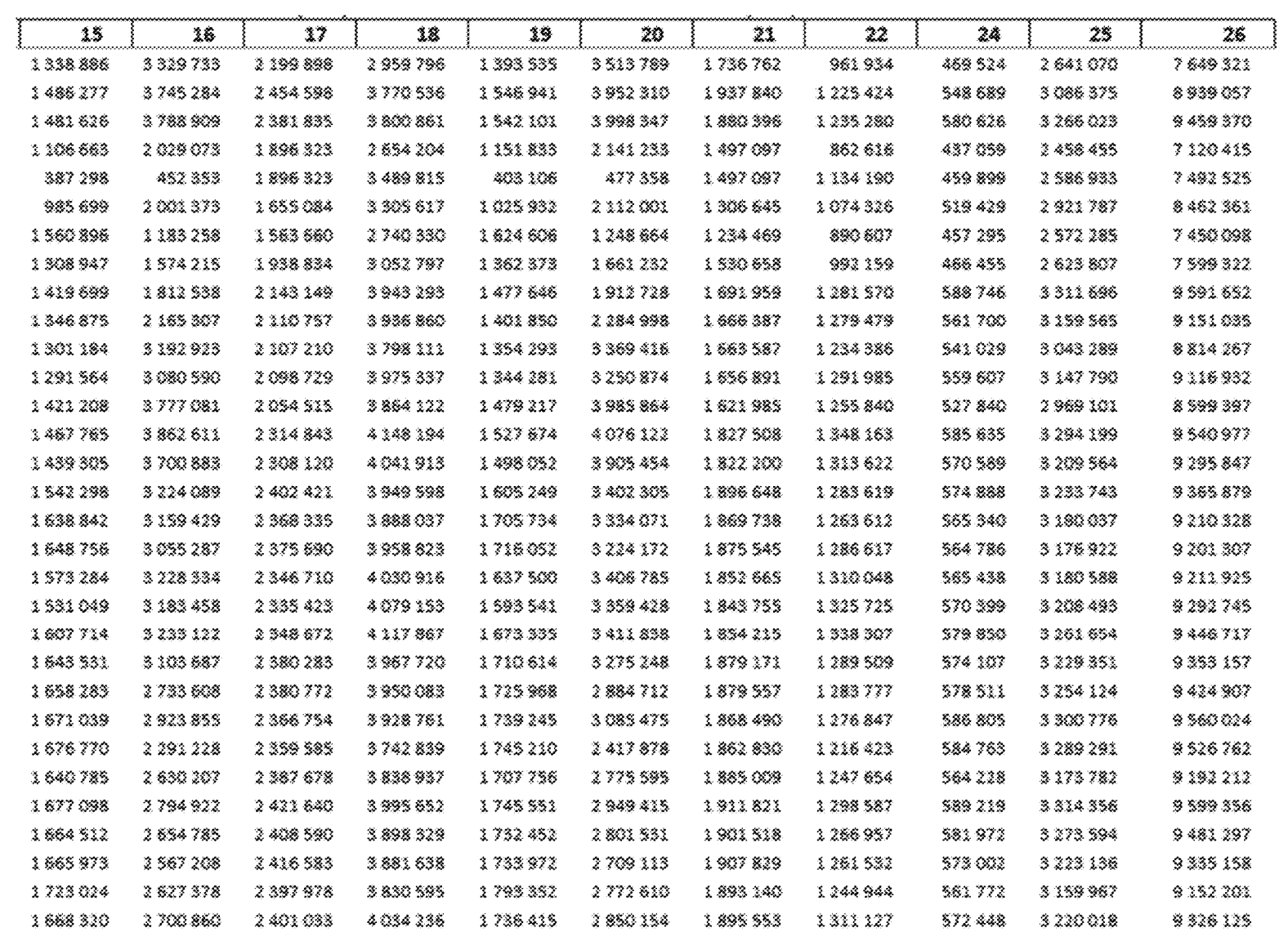

FIG. 4 is a chart containing example duty values determined for heat exchangers according to aspects of the subject technology.

FIG. 5 is a chart containing example Heat Transfer Coefficients determined for heat exchangers according to aspects of the subject technology.

DETAILED DESCRIPTION

Figure 1:
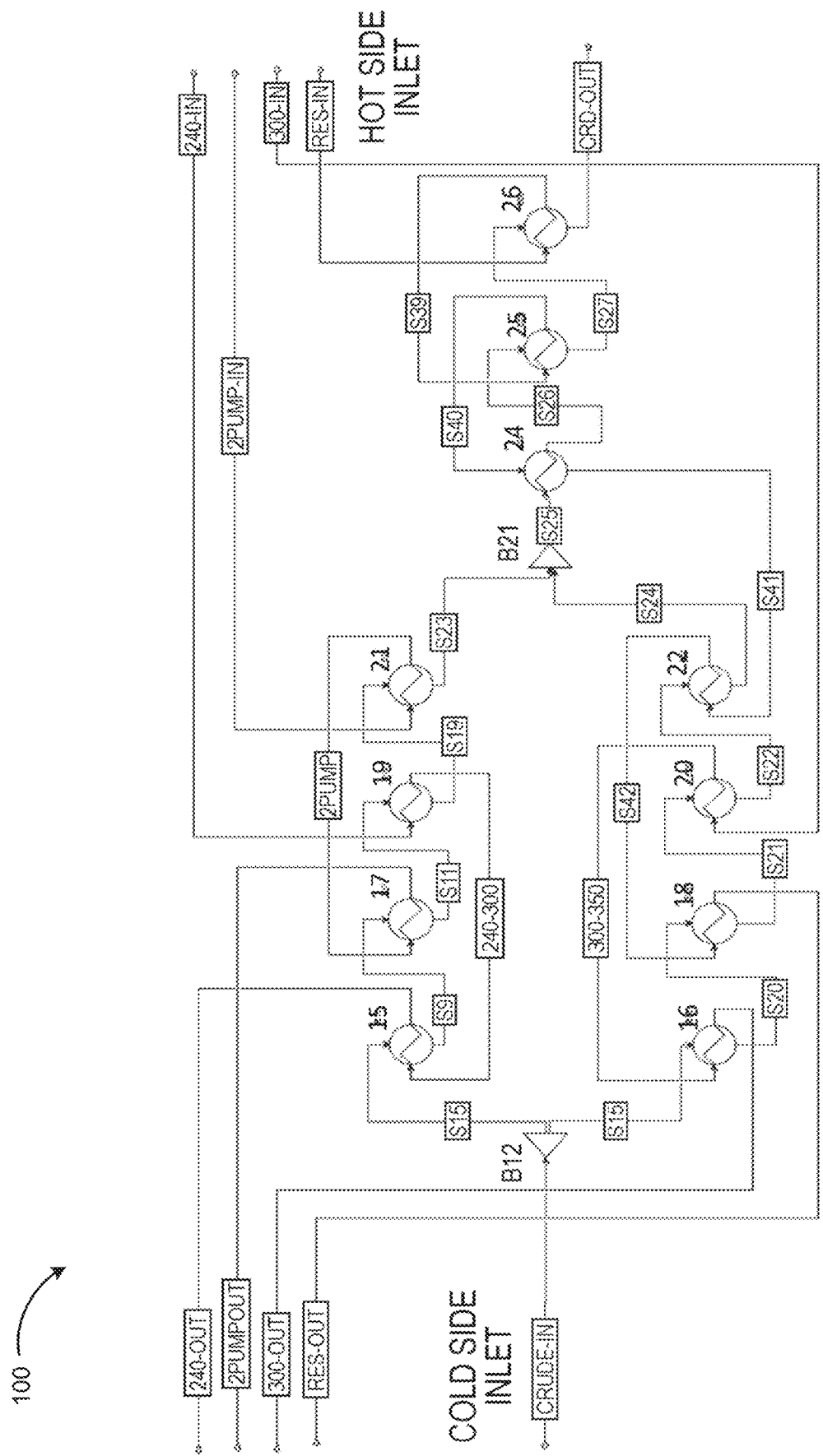
FIG. 1 is a diagram illustrating components of a preheat train system according to aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Definitions

As used in the preceding sections and throughout the rest of this specification, unless defined otherwise, all technical and scientific terms used herein have the same meaning as is commonly understood by one skilled in the art to which this invention belongs. All patents and publications referred to herein are incorporated by reference in their entireties.

The term "a", "an", or "the" as used herein, generally is construed to cover both the singular and the plural forms.

The term "about" as used herein, generally refers to a particular numeric value that is within an acceptable error range as determined by one of ordinary skill in the art, which will depend in part on how the numeric value is measured or determined, i.e., the limitations of the measurement system. For example, "about" can mean a range of ±20%, ±10%, or ±5% of a given numeric value.

Overview

The subject technology integrates chemical innovation, process innovation, and business model innovation into a solution aimed to maximize technical, economic, and environmental performance of industrial processes through reducing energy consumption of the industrial processes via cleanliness of the components such as heat exchangers within a preheat train. The subject technology utilizes a broad spectrum of data to manage cleaning processes for the equipment used and to achieve improvements in the performance of the industrial processes. As discussed in further detail below, the spectrum of data includes, but is not limited to, product data, component data, fouling data, operational data, economic data, and environmental data.

According to aspects of the subject technology, a method for cleaning processing equipment may include generating a function characterizing a relationship between fouling formation in the processing equipment and operation of the processing equipment. A cleaning recipe may be selected based on properties of fouling material formed in the processing equipment during operation of the processing equipment. Operating costs associated with each of a plurality of cleaning schedules may be determined based on the first function and the cleaning recipe and one of the plurality of cleaning schedules may be selected based on the respective determined operating costs. A cleaning process on the processing equipment may be executed according to the selected cleaning schedule using the selected cleaning recipe.

The generated function may provide an amount of fouling material per unit area formed as a function of operating days of the processing equipment. The processing equipment may include a heat exchanger, and a temperature of each of a cold side utility entering the heat exchanger, the cold side utility exiting the heat exchanger, a hot side utility entering the heat exchanger, and the hot side utility exiting the heat exchanger may be measured and recorded. The function may be generated based on the recorded temperatures.

The cleaning recipe may include a composition of a cleaning material circulated through the processing equipment during the cleaning process and a duration of circulating the cleaning material through the processing equipment. The cleaning recipe may include a plurality of cleaning materials and a respective plurality of durations of circulating the respective cleaning materials through the processing equipment. The plurality of cleaning materials may include a first cleaning material and a second cleaning material different from the first cleaning material. The plurality of durations may include a first duration and a second duration different from the first duration.

A sample of the fouling material may be analyzed to determine the properties of the fouling material. The properties of the fouling material may include chemical composition, density, and thermal conductivity of the fouling material. The operating costs may include costs of executing the cleaning process and costs of operating the processing equipment at fouling levels determined based on the generated function. The operating costs may further include monetization of emission reductions due to operating and cleaning the processing equipment according to the selected cleaning schedule. The operating costs associated with each of the plurality of cleaning schedules may be determined by executing simulations of operating the processing equipment.

The plurality of cleaning schedules may include a first cleaning schedule having a first cleaning interval and a second cleaning schedule having a second cleaning interval different from the first cleaning interval. The plurality of cleaning schedules may include a maximum cleaning interval determined based on the properties of the fouling material.

The processing equipment comprises a plurality of components, and for each of the plurality of components, a function characterizing a relationship between fouling formation in the processing equipment and operation of the processing equipment is generated; a cleaning recipe based on properties of fouling material formed in the processing equipment during operation of the processing equipment is selected; operating costs associated with each of a plurality of cleaning schedules based on the first function and the cleaning recipe are determined; and one of the plurality of cleaning schedules based on the respective determined operating costs is selected.

A sample of the fouling material may be removed from the processing equipment in association with the executed cleaning process. The steps of generating the function, selecting the cleaning recipe, determining the operating costs, and selecting one of the plurality of cleaning schedules may be repeated based on the removed sample.

Preheat Train Example

FIG. 1 is a diagram illustrating a preheat train ("PHT") 100 according to aspects of the subject technology. As depicted in FIG. 1, PHT 100 includes eleven heat exchangers ("HEX") 15-26 through which a first utility such as preflashed crude may be passed via a cold side inlet and through which one or more second utilities may be passed via a hot side inlet to transfer heat to the first utility. The second utilities may include heavy gas oil at different temperature ranges (e.g., 240-300 C, 300-350 C), atmospheric residue, and/or a pump-around flow from a distillation tower or other component used in the industrial processing incorporating PHT 100. HEXs 15-26 are not limited to any type of heat exchanger configuration. HEXs 15-26 may use all the same type of heat exchanger or two or more of HEXs 15-26 may use different types of heat exchangers. The subject technology is not limited to the number of HEXs, the arrangement of the HEXs, or the arrangement of the utility flow paths depicted in FIG. 1.

Data

The cognitive cleaning framework described herein is adaptable to real-world data-related challenges, which may encompass highly heterogeneous data availability, data integrity, data reliability, data security and other data challenges. The cognitive cleaning framework may rely upon physical modeling, data science and machine learning methods and tools. Consequently, the cognitive cleaning methods may improve as more data is accumulated and incorporated into the process.

Data used in cognitive cleaning framework can be divided into following categories:
(1) Product data: data on physical and chemical properties of products run within PHT units;
(2) PHT data: data characterizing the PHT units (i.e. unit specification), architecture, individual current and historical performance of the units within the PHT;
(3) Fouling data: data characterizing fouling within the PHT, which may include both physical and chemical properties;
(4) Operational data: data on production throughput, costs, scheduled and non-scheduled interventions procedures of various natures (e.g., maintenance, repairs), their duration, reasons, costs, results;
(5) Economic data: data describing outer systems (e.g., macroeconomics, fuel costs, product costs, market price of supplies); and
(6) Environment data: data on fuel (e.g., fuel type, amount, heat of combustion, fuel emission factor), $CO_2$ emissions allowances, $CO_2$ emissions allowances market price.

Product Data

Product data may include data on both cold and hot products (e.g., density, viscosity), data on past cleaning, laboratory tests results, and chemical characteristics of the products. Product data may include information on crude oil blend including, but not limited to: API, viscosity @ 80 C; viscosity @ 260 C, Total sulfur (% wt), Iron (ppm), Nickel (ppm), Vanadium (ppm), Saturates (%), Aromatics (%), Resins (%), Asphaltenes (%), and CII.

Other properties of the product (e.g., utility passed through PHT 100 via the cold side inlet) and properties of the utility passed through PHT 100 via the hot side inlet also may be accumulated and stored. For example, heat capacity, density, thermal conductivity and viscosity of both utilities may be accumulated and stored. The subject technology is not limited to the foregoing types of product data may include other data types.

PHT Data

PHT data may include unit specifications, PHT architecture, and overall information including, but not limited to: plant location; service of snit; size, type, connection type (parallel/consecutive), number of series; surface/unit (Gross/Eff), and surface/shell (Gross/Eff). PHT data also may include individual unit performance data including, but not limited to: fluid allocation, fluid name, fluid quantity—vapor in/out, liquid, steam, water, non-condensables), temperature in/out, specific gravity, viscosity, molecular weight (vapor), molecular weight (non-condensables), specific heat, thermal conductivity, latent heat, inlet pressure, velocity, pressure drop, and fouling resistance. PHT data also may include unit performance data include, but not limited to: heat exchange and transfer rate (service). PHT data also may include construction data (shell/tube sides) including, but not limited to: design/test pressure; design temperature; number of passes per shell; corrosion allowance (including connections in/out, and intermediate); tube numbers, thickness, length, and pitch; tube type, material; bypass seal arrangement; expansion joint; and Rho-V2-inlet nozzle.

PHT 100 may include one or more sensors for measuring operating conditions of PHT 100, with the measurements being captured and stored. The sensors may include temperature sensors arranged at the inlets and outlets of the respective HEXs in PHT 100 to measure a cold inlet temperature and hot outlet temperature of a first utility passing through the HEX and a hot inlet temperature and cold outlet temperature of a second utility passing through the HEX to transfer heat to the first utility.

Fouling Data

The cognitive cleaning frameworks is characterization method-agnostic. For example, either physical or chemical characterization may be used depending on actual situation on the plant. For the practical use, both chemical characterization of the fouling and understanding fouling deposits distribution within the units may be used.

Fouling deposits refer to any extraneous substance or material formed on the internal surfaces of the equipment during its exploitation. Formation of fouling deposits may result from thermodynamic or kinetic instability of the medium processed or handled in the equipment, chemical interaction of medium with surface materials, precipitation of mechanical impurities from the medium and biological contamination of the medium or the equipment. Fouling deposits may be attached to the internal surfaces of the equipment by adhesion forces, may form agglomerates which cannot pass the narrow areas of the equipment or may precipitate in the areas affected by insufficient flow velocity. In certain cases the whole medium handled in the equipment can solidify (most common case caused by accidental polymerization due to equipment malfunction or improper operation).

Fouling deposits may consist of organic and inorganic matter or a combination thereof, may be homogenous or feature a wide range of heterogeneity. Heterogeneity may be of layer or volume type. First case usually results from periodic changes in medium composition. Depending on temperature gradient, different areas of heat-transfer surface may be covered with deposits of different nature. Microstructure and chemical composition of fouling deposits is also subjected to aging. Assessment of the fouling deposits nature requires a representative sample to be taken, but due to above discussed issues this is not always possible. Alternatively fouling deposits nature may be derived analytically based on the historic data and/or data of global fouling repository.

Fouling characterization may be done analytically, where the results are derived based on the indirect modeling of operational and product data, or physically through laboratory analysis of the fouling sample. The objective of fouling characterization within the present approach is to establish a systematic practice of fouling modeling and cross-validating the results to ensure a good match between the model results and laboratory tests.

Fouling deposits characterization data may be obtained through a number of analytic methods including but not limited to: Fourier transform infrared spectroscopy (FTIR), scanning electron microscopy (SEM), SEM energy dispersive spectroscopy (SEM-EDS), X-ray crystallography (XRC), atomic absorption spectroscopy (AAS) and atomic emission spectroscopy with inductively-coupled plasma (ICP-AES).

Fouling characterization can be done in one of several ways including but not limited to: Physical modeling, Machine learning methods, and hybrid integrating physical modeling with machine learning methods. Fouling Characterization results can include fouling sequence analysis, facies analysis, qualitative and quantitative interpretation (referring to analytical and samples lab analysis), and chemical and physical description of the facies within the fouling sequence.

Combining hybrid model with physical properties of the product data (density, viscosity, crude oil grade, chemical properties) allows the subject technology to characterize the fouling which is used to design the personalized cleaning recipe (block 204).

In certain cases fouling characterization can be simulated based on synthetic data generated by 1-3 models. Such simulations can be useful for history matching purposes to limit number of base scenarios within the simulation.

Within the fouling characterization process the following major fouling mechanisms may be modeled and co-modeled:

Corrosion fouling, representing chemical reactions between PHT metal surfaces and any components or dissolved gases of the flowing fluid;

Chemical fouling, representing chemical reactions or phase-transitions between/of any components of the flowing fluid which result in precipitation of solids on the surface of the heat exchanger;

Particles fouling, representing accumulation of suspended particles contained in the flowing fluid; and Crystallization fouling—representing deposits of salts dissolved in the flowing fluid which crystallize on the inner surface of heat exchanger.

It is noted that mechanical imperfections on the surfaces of the PHT can accelerate corrosion and other fouling mechanisms.

Assessment of the the nature of fouling deposits may involve one or more of the following steps:

(1) Acknowledgement of the sample as a representative for the fouling deposits of the particular equipment unit. This can be done based on the information provided by personnel involved in the sampling. In case of heat-transfer equipment, only samples taken directly from the heat-transfer surfaces of heat-exchangers and including the full cross-section of the fouling deposits should be considered as representative. Macrostructure (e.g., the average size of the lumps or layer structure) of the fouling deposits should be adequately preserved in the sample. A representative sample is supposed to behave in all ways similarly to the original fouling deposits.

(2) Estimation of the degree of homogeneity of the sample and its consequences for the quality of the data obtained at the subsequent steps. Samples with a high degree of macroscale heterogeneity may require separation of heterogeneous mixture and its differential assessment at the subsequent steps.

(3) Assessment of the sample macrostructure and physical characteristics—the average size of the lumps, the layer thickness, porosity, elasticity, hardness, brittleness and so on. This step is useful for the evaluation of applicability of chemical cleaning methods based on the dispersion of fouling matter and chemical cleaning methods enhanced by various physical treatments discussed in more detail below. Basic mechanical testing for mineral scales, petcoke and similar hard solid or glass-like fouling may be comprised of the estimation of force required to crush a spherical lump of deposits of a specific size. Elastic fouling deposits may be assessed for yield strength.

(4) Estimation of the organic and inorganic content of the sample.

(5) X-ray crystallography (XRC) assessment of inorganic constituents of the sample. Alternatively elemental analysis of the inorganic part of the sample (preferably by AAS/AES methods).

(6) Assessment of organic composition of the sample may be done by instrumental methods such as CHNOS analysis, IR-spectroscopy or by manual solvent screening.

(7) Samples from the equipment featuring high-temperature processing of organic materials may be assessed for the content of elemental carbon.

Operational Data

Operational data may be collected across an entire production history and used in a plant digital twin to support effective decision-making. The cognitive cleaning framework may be fitted with a plant digital twin platform, though it can still run effectively when operational data is available. Operational data may include, but is not limited to: production cost, production throughput, operational events—maintenance and reparation including costs, duration, results, and also environmental data on emission and pollution threshold.

Economic Data

Macroeconomic and industry data and forecasts may be used for predictive assertions which imply reliance on the overall economic parameters, markets and global outlook. This data can be procured directly from the market (e.g., IHS Markit) or assembled through research. According to aspects of the subject technology, economic forecasts may be aligned with the company strategic vision and internal economic models.

Greenhouse Gas Emissions Data

Greenhouse Gas Emissions (GHG) from the fossil fuel overconsumption due to fouling and scale deposits accumulation in heat exchangers may be and used for development of the cleaning schedule to ensure GHG abatement through deployment of cognitive cleaning technology. The GHG emissions reduction obtained through the cognitive cleaning technology may be used for Carbon Credits allowance trading or similar mechanism (i.e. EUA ticker at ICE exchange).

Real Time Data

Real-time data may be captured and accumulated using an enterprise Internet of Things ("TOT") platform to collect, preprocess, store, and deliver connected sensors data. The cognitive cleaning framework may operate using lower discretization rates based on the manually collected data, though some functionality (i.e. real-time cleaning thresholds) may be reduced.

Historical Data

Historical data used with the cognitive cleaning framework may be retrieved from corporate repositories of data where it is accumulated. Obtaining historical data from a corporate data lake, may be preferable since it's empowered through corporate data governance policy, which can be seen as a quality assurance method enabling data availability, data usability, data consistency, data integrity and data security through a defined set of procedures and an approach to execute those procedures. A data lake is an approach for ingesting and storing all types of data "as is" in data repositories, and providing an enterprise-wide unified access to this data for information management, analytical and reporting purposes. A data lake supports multiple views of data such as global and local view by maintaining metadata and lineage of data. Certain clarifications can be made through a data steward who ensures that the data governance processes are followed.

Data Formats

Data may be collected, stored, transmitted in analog and/or digital forms. The subject technology can be used with both forms of data, though industry standard digital data formats (e.g., csv, json, txt, xls) may provide better results relative to using analog data formats. The cognitive cleaning framework is protocol-agnostic. For example, MQTT (Message Queuing Telemetry Transport) protocol may be deployed by the enterprise IOT platform.

Cognitive Cleaning Method

Figure 2:
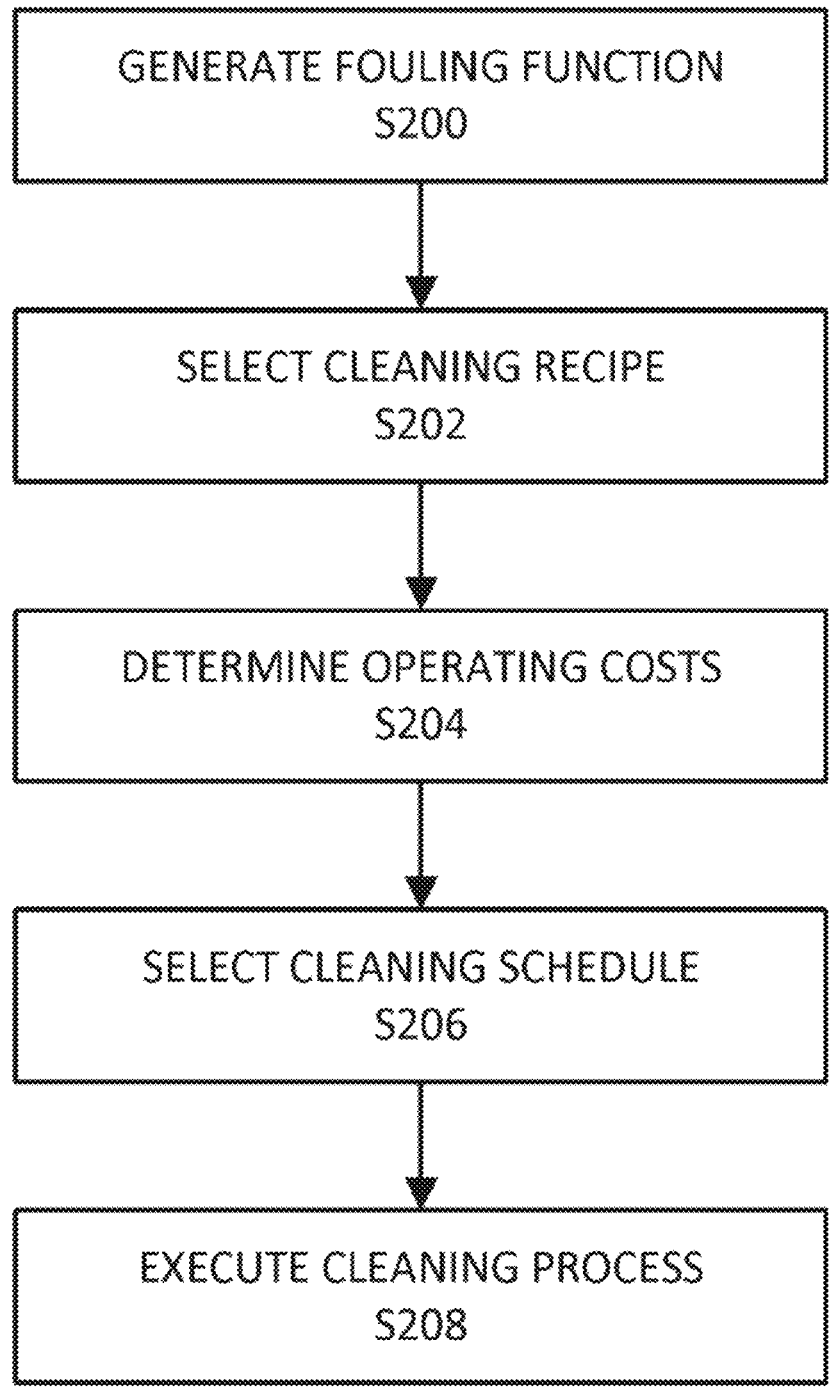
FIG. 2 is a flow diagram illustrating a cognitive cleaning process according to aspects of the subject technology.

FIG. 2 is a flowchart illustrating a process for performing a cognitive cleaning method according to aspects of the subject technology. The process is illustrated in FIG. 2 as being executed serially or linearly, however, the subject technology is not limited to that arrangement and two or more of the steps may be performed in parallel. Briefly, the process may include generating a fouling function, selecting a cleaning recipe, determining operating costs, selecting a cleaning schedule, and executing a cleaning process, which are described in detail below. The process may be executed by one or more processors configured to access data, such as the data described above, and execute one or more sequences of instructions stored on a machine readable medium to perform the process as described herein. Such a processing system is described in further detail below.

According to aspects of the subject technology, a fouling function may be generated to characterize the relationship between fouling formation and PHT operational data, and its influence over heat transfer and costs. The fouling function may be used to estimate a fouling level and/or generate a fouling level forecast for a given crude assay and technological regime. A fouling function may be determined for each HEX in the PHT and may be based on a number of different parameters, such as fouling resistance, foulant density, and foulant thermal conductivity.

Temperature may be measured for each HEX at the cold side inlet (cold in), the cold side outlet (hot out), the hot side inlet (hot in) and the hot side outlet (cold out). The measured temperatures may be captured and stored in machine-readable media for subsequent access and processing. The subject technology is not limited to any particular interval for measuring the storing the temperature values. Temperature values may be measured and stored every minute, every hour, every day, averaged over a period of time, etc. FIG. 3 is a table depicting temperature measurements recorded for HEX 24, HEX 25, and HEX 26. Using the recorded temperature values, a log mean temperature different (LMTD) is determined for each set of temperature measurements for each HEX. LMTD is determined using the following equation:

$$LMTD = \frac{\Delta 1 - \Delta 2}{\ln\left(\frac{\Delta 1}{\Delta 2}\right)} \qquad (1)$$

$\Delta 1$ is the temperature difference between the inlet and the outlet HEX for the hot side utility. $\Delta 2$ is the temperature different between the inlet and the outlet of the HEX for the cold side utility.

A duty (Q) for each HEX may be determined using the following equation:

$$Q = m \times C_p \times (T2 - T1) \qquad (2)$$

m is a mass flow rate (e.g., kg/hr) of the cold side utility (crude), $C_p$ is the heat capacity (e.g., kcal/kg*K) of the cold side utility, and T2 and T1 are the measured temperatures at the outlet and the inlet of the HEX for the cold side utility. Mass flow rate and heat capacity of the cold side utility may be gathered and stored at the time of setting up the PHT for the industrial process. FIG. 4 is at able depicting the duty values determined for each of HEXs 15-26.

An average heat transfer coefficient (HTC) (U) may be determined for each set of values according to the following equation:

$$U = \frac{Q}{(A \times LMTD)} \qquad (3)$$

where Q is the determined HEX duty, LMTD is the determined logarithmic mean temperature difference, and A is the heat flow area of the HEX, which may be obtained or determined using architecture parameters of the HEX. FIG. 5 is a table depicting HTC values determined for HEXs 15-26.

Figure 6:
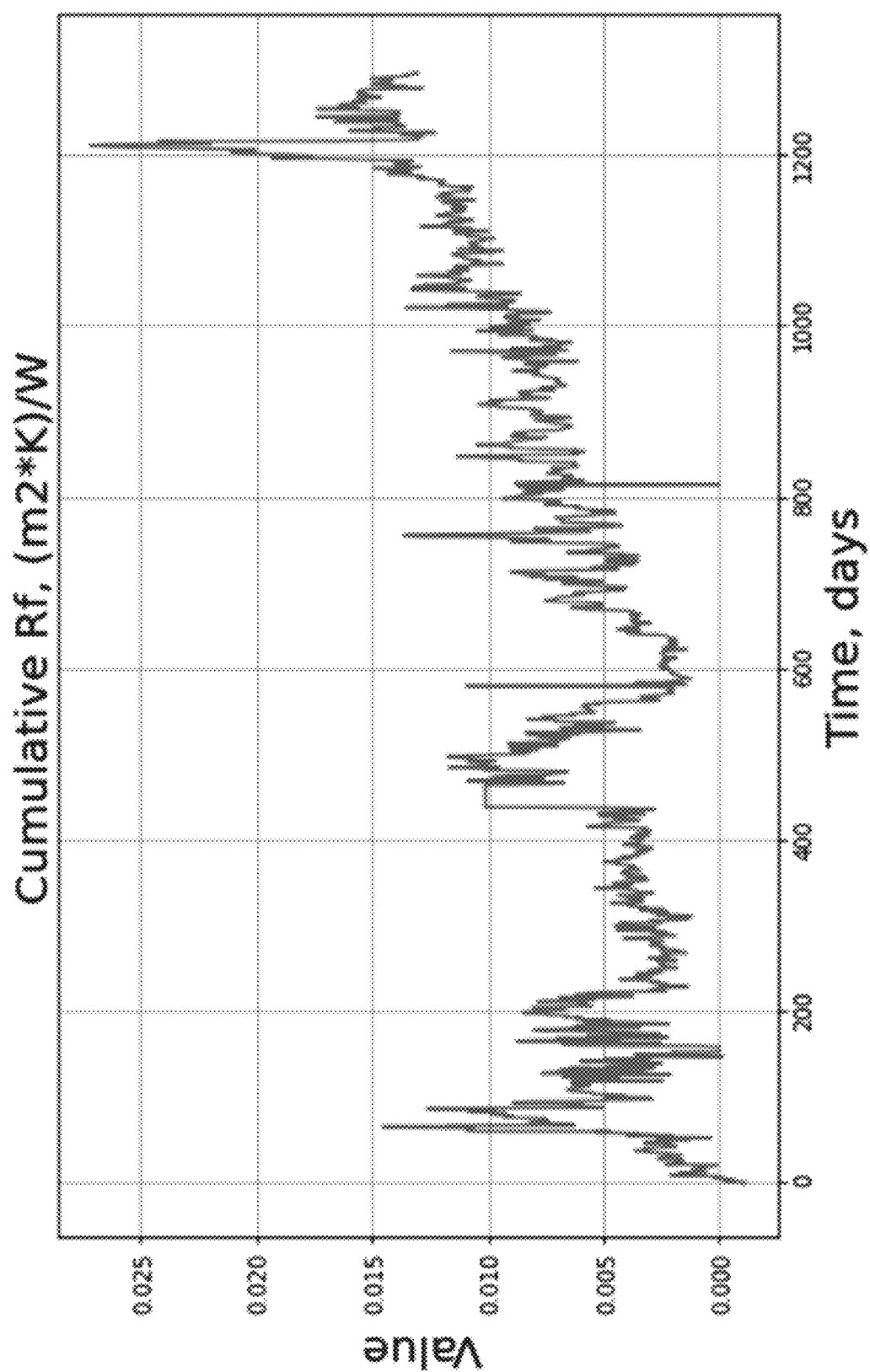
FIG. 6 is a chart illustrating fouling resistance values for a heat exchanger according to aspects of the subject technology.

Using the determined HTC data for each HEX, a fouling resistance (Rf) may be determined using the following equation:

$$R_f = \frac{1}{U_a} - \frac{1}{U_c} \qquad (4)$$

where $U_a$ is the actual HTC of the HEX determined using the measured values and $U_c$ is the clean HTC of the HEX assuming the HEX is clear of fouling. FIG. 6 is a graph illustrating changes in the fouling resistance over time for one of the HEXs in the PHT.

Figure 7:
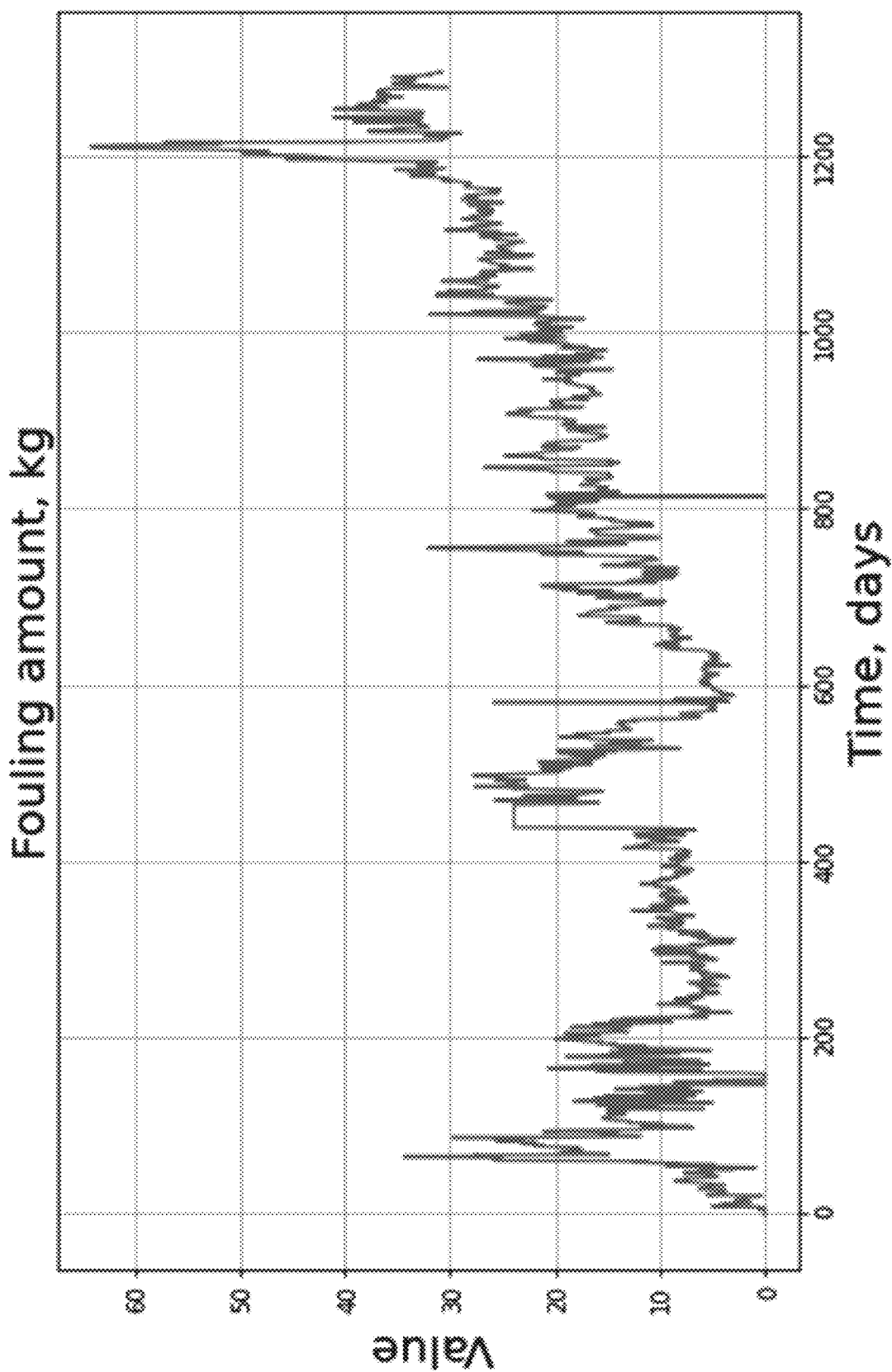
FIG. 7 is a chart illustrating amounts of fouling deposits formed in a heat exchanger according to aspects of the subject technology.

An amount of fouling (mf) forming in a HEX may be determined using the following equation:

$$m_f = \rho_f \lambda_f R_f \qquad (5)$$

where $\rho_f$ is the density of the foulant formed in the HEX and $\lambda_f$ is the thermal conductivity of the foulant formed in the HEX, which may be determined through analysis of fouling samples removed from the HEX or through other techniques described above. FIG. 7 is a graph illustrating the amount of foulant formed in a HEX over time based on the previously determined values for the fouling resistance.

Data including the amount of fouling determined using equation (5) and the associated operating parameters may be analyzed to determine Fouling Function—a relationship between fouling formation and PHT operational data, and its influence over heat transfer and costs. Such a relationship may be established using physical modeling, machine learning methods, and/or a hybrid integrating physical modeling with machine learning methods. Physical models may utilize detailed information of the PHT (for example, geometry of heat exchangers, technological architecture, physical properties of the flows and PHT equipment). Physical models may be cross-validated by history matching data to calibrate and improve accuracy. Machine learning methods may establish relationships between fouling and operational data based on data analysis and may utilized relatively large amounts of historical data with high discretization to produce stable results. Hybrid modeling combines both physical and machine learning methods to produce accurate and quick results, where physical information may be preserved and used to improve precision of the model.

Figure 8:
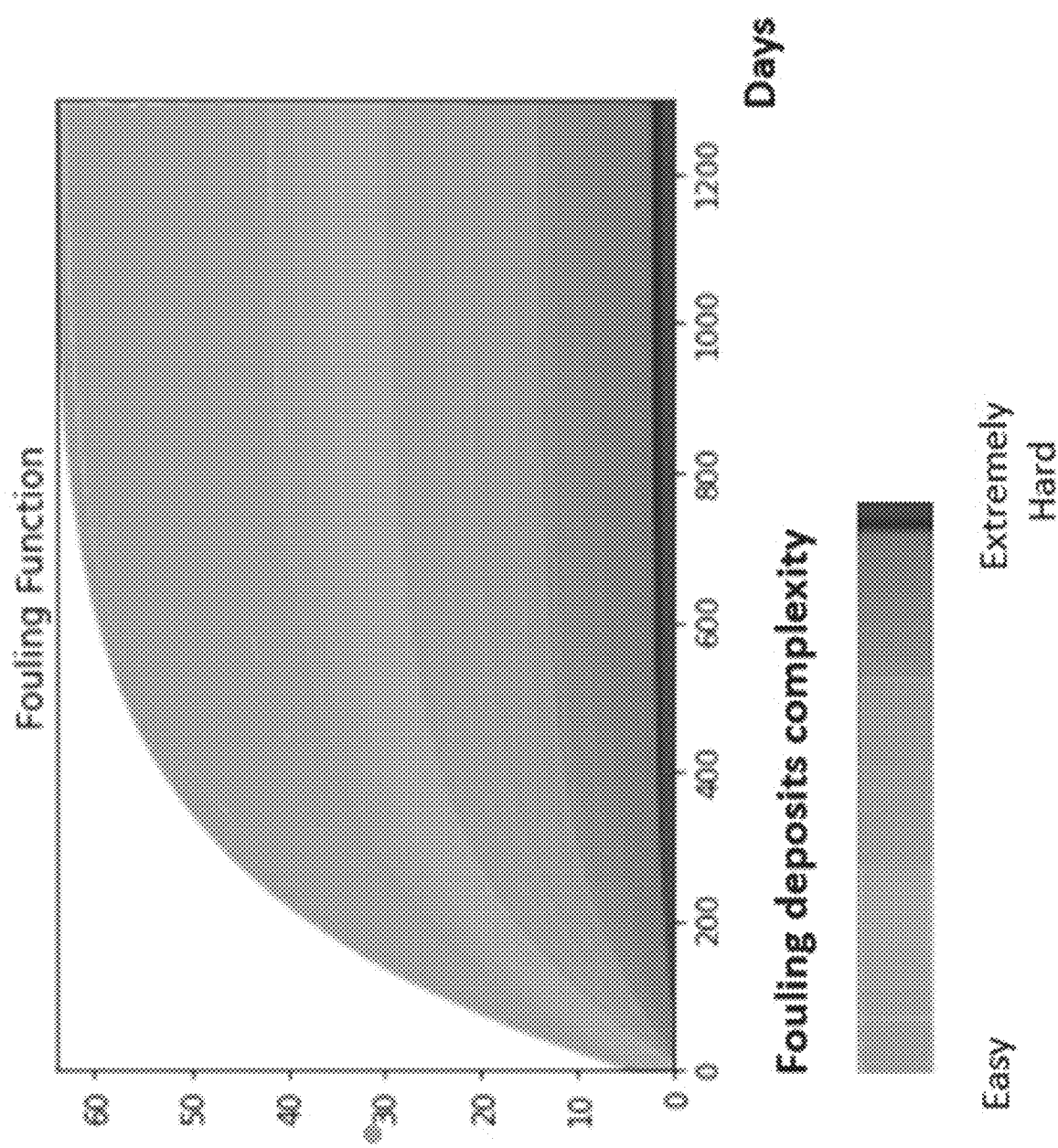
FIG. 8 is a graph illustrating fouling deposits and fouling complexity according to aspects of the subject technology.

FIG. 8 is a graph depicting fouling formation in a HEX based on the determined fouling function according to aspects of the subject technology. In addition to the amount of foulant formed in the HEX, FIG. 8 depicts complexity of the fouling deposits based on aging analysis. Aging represents the physical and/or chemical conversion of the fouling deposits over time under the processing conditions for the HEX. A fouling ageing function may be estimated for each heat exchanger based on the fouling samples analysis (e.g., exponential assuming stationary temperatures). The ageing data may be procured from many sources including commercial software and/or analysis of fouling samples.

Cleaning Recipe Selection

Returning to FIG. 2, a cleaning recipe or cleaning method may be selected based on analyzed properties of fouling material formed in the HEX. The fouling samples may be formed in the processing equipment (e.g., HEX) during operation of the processing equipment and removed as part of a cleaning process or other maintenance cycle.

The cleaning recipe (PCR) represents a specific design of a fouling-driven chemical composure sequence, its volume and application method for the HEX unit fouling treatment. The cleaning recipe may be designed based on the determined fouling function model and characterizations of the foulant formed within the HEX based on analysis and other techniques noted above. A cleaning recipe may be determined for each HEX in the PHT and may be designed manually or automatically depending on the complexity of the fouling and experience with particular heat exchangers within PHT.

From a functional point of view, the PCR may implemented in two forms which serve different objectives: a provisional PCR; and an actual PCR. The provisional PCR may be an assessment of a cleaning recipe used within the cognitive cleaning planning phase as an input to the determine a cleaning schedule or Smart Schedule. The provisional PCR may provide data used for simulation and evaluation of the results along with the Monthly, Quarterly and Annual Fouling Level Forecasts, described further below. The actual PCR is an actual cleaning recipe used within the cleaning implementation phase which is used in executing the selecting cleaning recipe according to the selected cleaning schedule using a weekly fouling level forecast and a pre-cleaning Fouling Characterization report, for example. The PCR may be determined and selected using physical modeling, machine learning methods, or a hybrid integrating physical modeling with machine learning methods according to aspects of the subject technology. The PCR results may include both chemical products content and also treatment technology (treatment phases, their duration, environment). PCR strategy development may consider priority of safety and corrosion conditions in cleaning conditions and logistics conditions.

Cleaning Methods Overview And Terminology

The selection of a cleaning recipe may involve selection of a cleaning method appropriate for the HEX and the fouling characteristics. Cleaning method refers to a specific set of technical actions/chemical or physical treatments intended to remove the fouling deposits from the equipment to be cleaned; a particular cleaning method is based on a specific chemical interaction or physical principle which accounts for its action and determines its efficiency. Existing cleaning methods can be divided into mechanical, physical and chemical cleaning methods.

Mechanical cleaning methods involve using of various instruments to mechanically remove the fouling deposits and includes such methods as drilling, pigging and hydro-blasting (hydro-jetting). The majority of mechanical cleaning methods require physical labor or intricate automated set-up to substitute for it. Physical cleaning methods employ various physical treatments resulting in the destruction or detachment of fouling deposits, this group includes steaming, ultrasonication, pulsating flow, hydrokinetics etc. Chemical cleaning methods make use of washing solutions containing various chemical reagents or combinations thereof to dissolve (completely or partially) disperse or loosen the structure of fouling deposits.

Cleaning methods can be classified as disassembly and non-disassembly methods, first group requires the disassembly of the equipment to be cleaned, second group does not require the disassembly. In general, mechanical cleaning methods require the disassembly of the equipment, whereas physical and chemical cleaning methods do not. A number of mechanical and physical cleaning methods can be used either simultaneously or be followed or be preceded by chemical cleaning methods. If used simultaneously with the chemical cleaning methods, the mechanical and physical cleaning methods are also referred to as an enhancement methods. If used prior to the chemical cleaning methods, the mechanical and physical cleaning methods are referred as pretreatments. A particular cleaning method can possibly be employed in a number of specific embodiments, each of which represent a specific technical implementation of the method adjusted to the specific equipment type/set-up. For chemical cleaning methods the embodiments usually differ in a specific mode the washing solution is brought into contact with fouling deposits and the respective technical hardware and set-up to enable such mode. It should be noted, that mechanical cleaning methods are generally applicable to all possible types of fouling deposits and can be limited in use only due to downtime and equipment type considerations (certain types of equipment cannot be disassembled or even being disassembled feature hard-to-reach areas).

Cleaning Recipe

Classification of fouling deposits may be used to select chemical cleaning methods previously determined to be successful at removing the particular types of fouling deposits. Table 1 lists characterizations of fouling types and applicable chemical cleaning methods.

TABLE 1

Chemical cleaning methods for various deposits

| Nature of the fouling deposits | Applicable chemical cleaning methods |
|---|---|
| Mineral scales mostly consisting of alkaline earth metals carbonates or alkaline earth metal carbonates and loose iron oxides/carbonates/silicates/ | Acid flushing<br>Chelate flushing |
| Mineral scales mostly consisting of alkaline earth metals carbonates and hard iron oxides/silicates/phosphates | Acid flushing |
| Mineral scales mostly consisting of hard silicon oxide, aluminium oxide and alumosilicates | Acid flushing |
| Mineral scales mostly consisting of alkaline earth metal sulfates | Chelate flushing<br>Carbonate-acid alternation |
| Mineral scales mostly consisting of loose iron oxides/hydroxides/phosphates/carbonates | Acid flushing<br>Reductive acid flushing<br>Chelate flushing |
| Mineral scales mostly consisting of hard and glass-like iron oxides/hydroxides/phosphates/carbonates | Acid flushing<br>Reductive acid flushing |
| Mineral scales mostly consisting of pyrite/marcasite/greigite | Chelate flushing<br>Oxidizer flushing |
| Mineral scales mostly consisting of troilite | Acid flushing |
| Mineral scales mostly consisting of silicon dioxide/silicates | Acid flushing |
| Mineral scales mostly consisting of copper/zinc/aluminum oxides/salts | Acid flushing<br>Ammonia flushing<br>Chelate flushing |
| Pasty and tar heavy oil deposits with low content of elemental carbon and inorganic admixtures | Organic solvent flushing<br>Surfactant flushing |
| Pasty and tar heavy oil deposits with low content of elemental carbon and high content of inorganic admixtures | Organic solvent flushing + acid flushing<br>Organic solvent flushing + surfactant flushing<br>Organic solvent flushing + chelate flushing<br>Organic solvent flushing + AlfaPEROX |
| Solid and glass-like heavy oil deposits with high content of elemental carbon | Organic solvent flushing + AlfaPEROX |
| Porous petcoke with loose structure | AlfaPEROX<br>Carbonate-acid alteration |
| Petcoke with rigid structure or solid not porous petcoke with a high content of elemental carbon | Mechanical cleaning methods |
| Fouling deposits mostly consisting of organic polymers/oligomers insoluble in water with low content of elemental carbon and inorganic admixtures | Organic solvent flushing |

TABLE 1-continued

Chemical cleaning methods for various deposits

| Nature of the fouling deposits | Applicable chemical cleaning methods |
|---|---|
| Fouling deposits mostly consisting of organic polymers/oligomers of various chemical groups with high content of elemental carbon and/or inorganic admixtures | Organic solvent flushing + acid flushing<br>Organic solvent flushing + chelate flushing<br>Organic solvent flushing + AlfaPEROX |
| Fouling deposits mostly consisting of organic polymers/oligomers with ionizable functional groups | Acid flushing<br>Alkali flushing<br>Organic solvent flushing<br>Organic solvent flushing + AlfaPEROX |
| Fouling deposits mostly consisting of lipids and their degradation products | Alkali flushing<br>Surfactant flushing<br>Organic solvent flushing + alkali flushing<br>AlfaPEROX |

Applications to Various Equipment Types

Selection of the appropriate cleaning method may be dependent on the configuration and the material of the HEX, material limits in the applicability of specific active ingredients, whereas configuration determines the specific embodiments. By configuration the equipment can be divided in two groups: equipment with inner cavity (or a number thereof) and equipment without inner cavity.

Equipment With Inner Cavity

Inner cavity refers to the internal volume of the equipment, which is structurally separated from the other parts of the equipment and outer space and can be filled with washing solution using any technically realized embodiment of the cleaning method. Inner cavity is characterized by specific spatial configuration, positioning of the inlet/outlet vents, drainage and air release valves, volume and surface area, which together determine the preferred embodiments.

Equipment with inner cavity is used to store liquids or gases (containers, tanks, cisterns), to process them (reactors, columns, heaters, heat exchangers) or to transport them (pipes), such equipment featuring at least two vents, can be further classified by the ratio of its inner surface area to the inner volume, referred to as S/V.

If S/V value is relatively large (>5 $m^{-1}$), then deposits can occupy significant part of the inner cavity of the equipment or even fully plug some of its parts. Examples of such equipment are heat exchangers and long piping systems. Provided the inner cavity has at least two vents, in this equipment chemical cleaning is performed preferably by closed loop circulation embodiment using large buffer tank which contains significant amount of washing solution and allows to provide sufficient ratio of washing solution to fouling material.

The general set-up consists of circulation pump, buffer tank, filter unit and connecting hoses. Extra installations required for specific cases may include reagent pump for AlfaPEROX cleaning method, air release valve, different types of measuring gauges and sensors, condenser, equipment required for implementation of physical enhancement methods. The output of the circulation pump and vent loop cross section should ensure sufficient flow rate inside the equipment cavity In case the equipment to be cleaned is elevated above the location of circulation pump, the dependence of pump output on static fluid pressure should be taken into account. Whenever it is possible, the outlet vent cross section should be smaller than that of the inlet, alternatively the outflow connecting hose of a lower diameter may be used. At a certain point of a cleanup process, direction of flow may be switched by swapping the connecting hoses between inlet and outlet vent, this technic can be useful for removing of large chunks of fouling material that otherwise could block the flow in certain areas of the inner cavity. In certain cases a number of equipment units or a separate inner cavities thereof may be connected consequentially in a single circulation loop and cleaned simultaneously.

The selection of filter material/mesh for filter unit should prevent the plugging of hoses and damage of circulation pump by large chunks of fouling material. The set of measuring gauges is defined by supposed set of online-control methods.

The set-up can be operated in manual or automated mode, reagent and circulation pump, air release valve and circulation loop valves can be activated and adjusted by operation system processing sensor data.

Depending on the specific nature of fouling deposits and washing solution, the ratio of washing solution volume to fouling material may vary from 3:1 to 100:1, for example. To specify the reasonable ratio of washing solution to fouling material the following may be considered:

the amount of fouling deposits inside the equipment cavity—can be measured as a difference between cavity nominal volume and the actual volume of water required to fill the cavity during the pressure test conducted before the cleanup process; otherwise the fouling material can be assumed to comprise some fraction of cavity nominal volume, assumptions can be made based on history data or predictive analysis.

the density of fouling material—can be measured by water displacement method.

the maximum amount of fouling material which can be dissolved by a volume unit of washing solution—can be derived based on fouling composition and solubility data of the respective substances. The interactions between washing solution and fouling material can be expressed a set of chemical equations.

the kinetics of supposed chemical interactions and its dependence on concentration of active ingredients—can be estimated by lab experiments. In certain case the significant excess of active ingredient is required to achieve the sufficient rate of deposit dissolution.

In case the sufficient ratio of washing solution to fouling material cannot be provided using the given buffer tank capacity, cleanup process should include replacement of wasted washing solution in a several cycles of circulation.

In case 0.5<S/V<5 $m^{-1}$, then ratio of free inner cavity volume to fouling deposits volume can be sufficient for cleaning method embodiments without buffer tank. Cleanup process can be conducted by any of the following embodiments: filling of the inner cavity with washing solution with subsequent soaking and drainage of wasted solution (it is also the only choice in case the cavity has only one vent);

filling and external circulation between the two vents. The latter case uses the same setup as closed loop circulation embodiment but lacks buffer tank. In case the washing solution is not circulated by pump, mixing may be provided by a line of compressed air submerged at the bottom of inner cavity. Alternatively, in certain cases convective mixing may be used.

If S/V<0.5 then ratio of free inner cavity volume to fouling deposits volume can become too high to make filling of inner cavity with washing solution economically unreasonable. Such cases require special embodiments featuring technical methods to cover the inner cavity surface with washing solution without complete filling of its volume.

Specific embodiment of chemical cleaning method for high capacity storage tanks may involve spraying of washing solution supplied from the top of the tank by jets directed to its walls. The solution with dissolved deposits flows down and can be removed through drainage outlet or pump placed at the bottom of tank. To extend contact time of solution with tank surface, solution viscosity can be increased by polymeric additives. Alternatively washing solution can be supplied as a foam, using of foaming additives allows to reduce the amount of washing solution needed to fill the given volume. Steaming with injections of washing solution may be used. Another embodiment may use water-filled rubber balloon or multiple inert bodies placed in the middle of the inner cavity in order to reduce ist free volume.

Equipment Without Inner Cavity

Equipment without inner cavity cannot be cleaned using closed loop circulation, the only choice for such equipment is submerging of the whole equipment unit or its separate parts in cleaning bath filled with washing solution. Depending on the complexity and geometry of the equipment unit or its parts and washing solution to fouling deposits ratio, mixing, circulation or changing of washing solution in the bath can be provided. Mixing or circulation are preferable for higher cleaning rate. It can be organized by using mechanical mixing devices, barbotage or by employing circulation loop connected to the cleaning bath. Gas formation taking place in washing solution can also effectively mix the solution. Cleaning process can be intensified by employing heating, boiling or ultrasonication. Water-jetting with filtered washing solution supplied from the bath can also be provided.

Material of the equipment should be taken into consideration while choosing the preferred cleaning method—the corrosion rate of the equipment material in selected washing solution under the process conditions should not exceed the acceptable value which is specified by equipment supplier or client.

Chemical Cleaning Methods

Chemical cleaning methods feature a fluid working medium which is brought into contact with fouling deposits and referred to as washing solution. Washing solution can consist of individual substance or a mixture of any number of substances. Washing solution can be colloid in nature. The substance which is accounted for the specific chemical action of washing solution related to its cleaning efficiency referred to as active ingredient.

The specific choice of active ingredients tailored to particular equipment unit under given fouling conditions and based on the data of fouling nature and historic data of washing solution performance referred to as smart recipe.

Chemical cleaning methods can be subdivided into methods based on the dissolution of the fouling matter (or the substances produced from chemical interaction of washing solution with fouling matter) and methods based on the dispersion and suspension of fouling matter in a washing solution. As the fouling deposits are usually heterogeneous in nature, pure dissolution or dispersion are rarely observed in practice and all cleaning methods are actually a combination of both mechanisms with a certain degree of prevalence of either dissolution or dispersion.

Methods based on the dissolution of fouling matter include acid, alkali, chelate and organic solvent flushing, carbonate-acid alteration; methods based mainly on the dispersion mechanism are surfactant flushing and AlfaP-EROX. It should be noted that specific washing solution may contain active ingredients referring to several cleaning methods thereby making the following classification limited in use.

Acid Flushing

Acid flushing is a chemical cleaning method based on the chemical interaction of acid with fouling deposits resulting in formation of soluble salts. Washing solution for this method contains acid as a main active ingredient, other ingredients may include corrosion inhibitors, surfactants, oxidizers or reducing agents, chelating and wetting agents, phase-transfer catalysts, hydrotropes etc. The method is especially useful and straightforward for removing of carbonate and loose iron oxide scales. The method may also be the choice for removing of organic fouling composed of amino functional organic polymers or polymers containing hydrolysable functional groups, for example, polyamides. The method is of limited use for any fouling containing no acid-reactive substances, however, some types of fouling, notably iron (III) oxides may be made reactive by employing of reducing agents (sodium sulfite, hydrazine salts) in washing solution, thus giving reductive acid flushing method.

A number of organic and inorganic acids can be employed, including, but not limited to hydrochloric, sulfuric, nitric, phosphoric, hydrofluoric, acetic, formic, sulfamic, citric, oxalic lactic, methanesulfonic acids. In some embodiments, the concentration of the acid is selected from the group consisting of about 0.01 M, about 0.02 M, about 0.03 M, about 0.04 M, about 0.05 M, about 0.06 M, about 0.07 M, about 0.08 M, about 0.09 M, about 0.10 M, about 0.11 M, about 0.12 M, about 0.13 M, about 0.14 M, about 0.15 M, about 0.16 M, about 0.17 M, about 0.18 M, about 0.19 M, about 0.20 M, about 0.3 M, about 0.4 M, about 0.5 M, about 0.6 M, about 0.7 M, about 0.8 M, about 0.9 M, about 1.0 M, about 2.0 M, about 3.0 M, about 4.0 M, about 5.0 M, about 6.0 M, about 7.0 M, about 8.0 M, about 9.0 M, and about 10.0 M.

Selection of acid is based on the solubility of the respective salts and the corrosion resistance of the equipment construction materials for a specific acid—thus sulfuric acid is not used for calcium and barium-containing fouling, hydrochloric acid is not used for mercury-containing fouling etc. Some types of fouling (sulfides and polysulfides of both mineral and organic nature) require mandatory use of oxidizing acids or addition of oxidizers to washing solution. In some embodiments, the oxidizer selected from the group consisting of ammonium perchlorate, potassium perchlorate, sodium nitrate, potassium nitrate, ammonium nitrate, lithium nitrate, rubidium nitrate, cesium nitrate, lithium perchlorate, sodium perchlorate, rubidium perchlorate, cesium perchlorate, magnesium perchlorate, calcium perchlorate, strontium perchlorate, barium perchlorate, barium peroxide, strontium peroxide, copper oxide, sulfur, hydrogen peroxide, and mixtures thereof. Fouling containing high percentage of silicates may be solubilized by addition of ammonium bifluoride to washing solution. Corrosion inhibitor is selected based on its efficiency towards specific acids and construction materials. In some embodiments, the corrosion inhibitor is selected from the group consisting of hexamine, phenylenediamine, benzotriazole, dimethylethanolamine, and mixtures thereof. Surfactants, phase-transfer catalysts, hydrotropes and wetting agents are used in the formulation in case of mixed fouling deposits containing a certain fraction of hydrophobic substances. In some embodiments, the surfactant is selected from the group consisting of dialkyl sulfosuccinic acid metal salts, dialkyl sulfosuccinic acid organic salts, alkyl benzenesulfonic acid metal salts, alkyl benzenesulfonic acid organic salts, Silwet-L-5130, and mixtures thereof. In some embodiments, the phase-transfer catalyst is selected from the group consisting of crown ethers, onium salts, cryptands, polyalkylene glycols, and mixtures thereof. In some embodiments, the wetting agent is selected from the group consisting of glycerin, 3-butanediol, triethylene glycol, 1,6-hexanediol, propylene glycol, 1,5-pentanediol, diethylene glycol, dipropylene glycol, trimethylol propane, trimethylol ethane, and mixtures thereof. In some embodiments, the hydrotrope is selected from the group comprising benzene sulfonates, xylene sulfonates, naphthalene sulfonates, short chain alkyl benzene sulfonates, C6-8 alkyl sulfonates, C6-C11 alkyl sulfates, C6-C10 alkyl dimethyl amine oxides, and alkyl diphenyloxide disulfonates, C6-11 alkyl ether sulfates containing up to 10 moles of ethylene oxide, polymeric hydrotropes, an alkylpolyglycoside having an average of 10 carbon atoms in the alkyl portion, and mixtures thereof. Chelating agents may be used in case of high content of iron or presence of insoluble alkaline earth metal salts in fouling deposits. Chelating agents, for example, the sodium salts of the polybasic organic acids or the polybasic organic acids themselves, such as EDTA, as well as derivatives of phosphorous acids, such as, NTMP and HEDP, can be used. Downsides of acid flushing method include handling of hazardous chemical materials; high risk of corrosion impact; complicated waste management (wasted washing solutions require neutralization prior to disposal) and the need for passivation solutions which are used to flush the equipment after the cleanup process.

Alkali Flushing

Alkali flushing is a chemical cleaning method based on the chemical interaction of basic substances with fouling deposits resulting in formation of water-soluble salts. As an active ingredient, washing solution for this method may contain sodium hydroxide, sodium carbonate, ammonia or its salts, amines or other organic substances with basic properties/functionality (later may refer to ammonia flushing). Washing solution may also contain surfactants, chelating agents, wetting agents, hydrotropes, oxidizers, and organic solvents etc. In some embodiments, the surfactant is selected from the group consisting of dialkyl sulfosuccinic acid metal salts, dialkyl sulfosuccinic acid organic salts, alkyl benzenesulfonic acid metal salts, alkyl benzenesulfonic acid organic salts, Silwet-L-5130, and mixtures thereof. In some embodiments, the phase-transfer catalyst is selected from the group consisting of crown ethers, onium salts, cryptands, polyalkylene glycols, and mixtures thereof. In some embodiments, the wetting agent is selected from the group consisting of glycerin, 3-butanediol, triethylene glycol, 1,6-hexanediol, propylene glycol, 1,5-pentanediol, diethylene glycol, dipropylene glycol, trimethylol propane, trimethylol ethane, and mixtures thereof. In some embodiments, the hydrotrope is selected from the group comprising benzene sulfonates, xylene sulfonates, naphthalene sulfonates, short chain alkyl benzene sulfonates, C6-8 alkyl sulfonates, C6-C11 alkyl sulfates, C6-C10 alkyl dimethyl amine oxides, and alkyl diphenyloxide disulfonates, C6-11 alkyl ether sulfates containing up to 10 moles of ethylene oxide, polymeric hydrotropes, an alkylpolyglycoside having an average of 10 carbon atoms in the alkyl portion, and mixtures thereof. In some embodiments, the oxidizer selected from the group consisting of ammonium perchlorate, potassium perchlorate, sodium nitrate, potassium nitrate, ammonium nitrate, lithium nitrate, rubidium nitrate, cesium nitrate, lithium perchlorate, sodium perchlorate, rubidium perchlorate, cesium perchlorate, magnesium perchlorate, calcium perchlorate, strontium perchlorate, barium perchlorate, barium peroxide, strontium peroxide, copper oxide, sulfur, hydrogen peroxide, and mixtures thereof. Chelating agents, for example, the sodium salts of the polybasic organic acids or the polybasic organic acids themselves, such as EDTA, as well as derivatives of phosphorous acids, such as, NTMP and HEDP, can be used. The method is especially useful for removing of organic polymers with acidic functional groups as their ionization by bases usually increases their solubility in polar solvents including water, another common application of the method involves removing of organic matter susceptible to alkaline hydrolysis, most notably lipids, but also polyester and polyurethane fouling deposits. Ammonia or organic amine flushing is a subtype of alkali flushing, which features lower pH value of washing solution and reduced corrosivity to aluminum alloys and some gasket materials. Ammonia flushing may also be the choice for removing of copper-containing deposits. Since some organic functional groups (carbonyl, double bond, sulfide) require oxidation to become acidic, washing solution may include specific oxidizers (sodium hypochlorite, potassium permanganate, sodium or ammonium percarbonates, perborates, persulfates). Washing solution may contain wetting agents and polar organic solvents in order to increase the solubility of organic polymers or improve the kinetics of their dissolution. Washing solution may contain surfactants to promote the dispersion of hydrolysis products.

Chelate Flushing

Chelate flushing is a chemical cleaning method based on sequestering of metal ions with chelating agents which allows to dissolve normally insoluble salts of the respective metals. Chelate flushing is the only choice for fouling deposits consisting mostly of alkaline earth metal sulphates, it can also be used for removal of iron oxide/sulfide deposits. Washing solution for chelate flushing contains chelating agent or a mixture thereof as an active ingredient. Any number of chelating agents may be used including but not limited to aminopolycarboxylic and polyphosphonic acids and their salts, thiocarboxylic acids, bicarbonyl organic substances. Selection of the specific chelating agent should be made taking into account the cation composition of the fouling deposits, comparative values of the respective stability constants and kinetic studies of various synergists combinations (synergists refer to some anions which being chemically inert are known to boost the rate of deposit dissolution). Washing solution for chelate flushing may contain acidic or basic substances to adjust pH value to the specific optimal level. Washing solution may also contain organic and inorganic anions as a synergists for chelating agents; surfactants, wetting agents, phase-transfer catalysts and organic solvents to promote the delivery of the active ingredient inside the fouling structure and allow the dispersion of its hydrophobic part in washing solution. In some embodiments, the surfactant is selected from the group consisting of dialkyl sulfosuccinic acid metal salts, dialkyl sulfosuccinic acid organic salts, alkyl benzenesulfonic acid metal salts, alkyl benzenesulfonic acid organic salts, Silwet- L-5130, and mixtures thereof. In some embodiments, the phase-transfer catalyst is selected from the group consisting of crown ethers, onium salts, cryptands, polyalkylene glycols, and mixtures thereof. Chelating agents, for example, the sodium salts of the polybasic organic acids or the polybasic organic acids themselves, such as EDTA, as well as derivatives of phosphorous acids, such as, NTMP and HEDP, can be used. In some embodiments, the organic solvent selected from the group consisting of a ketone solvent, an ester solvent, an alcohol solvent, an amide solvent, an ether solvent, and mixtures thereof.

Surfactant Flushing

Surfactant flushing is a chemical cleaning method based on dispersion/emulsification of water-insoluble hydrophobic matter in washing solution (known as micellization) and reduction of hardness and ductility of fouling deposits (known as Rehbinder effect). Combination of two above mentioned mechanisms allows loosening the structure of the fouling deposits and separation of its particles by flow of washing solution, separated particles remain suspended in washing solution and transported from the equipment to the filter unit or drained out of the equipment with the wasted washing solution.

Surfactant flushing is useful for removing of loosely adhered or liquid film hydrophobic fouling by water-based washing solution. Washing solution for surfactant flushing contains surfactant or a blend thereof as an active ingredient, washing solution may also contain acidic or basic substances, antifoaming agents, chelating agents, hydrotropes, organic solvents as an auxiliary components. In some embodiments, the surfactant is selected from the group consisting of dialkyl sulfosuccinic acid metal salts, dialkyl sulfosuccinic acid organic salts, alkyl benzenesulfonic acid metal salts, alkyl benzenesulfonic acid organic salts, Silwet-L-5130, and mixtures thereof. Chelating agents, for example, the sodium salts of the polybasic organic acids or the polybasic organic acids themselves, such as EDTA, as well as derivatives of phosphorous acids, such as, NTMP and HEDP, can be used. In some embodiments, the organic solvent selected from the group consisting of a ketone solvent, an ester solvent, an alcohol solvent, an amide solvent, an ether solvent, and mixtures thereof. In some embodiments, antifoaming agent selected from a fatty acid- or fatty ester-based antifoaming agent, a silicone-based antifoaming agent, a polyoxyalkylene-based antifoaming agent, a trialkyl phosphate-based antifoaming agent, and mixtures thereof. In some embodiments, an organic and inorganic acid may be included in the washing solution including, but not limited to hydrochloric, sulfuric, nitric, phosphoric, hydrofluoric, acetic, formic, sulfamic, citric, oxalic lactic, methanesulfonic acids. In some embodiments, washing solution for this method may contain sodium hydroxide, sodium carbonate, ammonia or its salts, amines or other organic substances with basic properties/functionality.

Organic Solvent Flushing

Organic solvent flushing is a chemical cleaning method based on dissolution of organic matter in a specific organic solvent or a mixture thereof. The method is used for removing of predominantly organic fouling deposits or composite fouling deposits featuring significant content of organic matter. Method can be applied as a pretreatment for chemical cleaning of mineral scales covered with hydrophobic surface film or consisting of mineral particles bound by organic polymers. Washing solution for this method contains organic solvent or a mixture thereof. As the organic fouling may consist of a broad spectrum of organic substances including oligomers and polymers which differ significantly in their solubility in various organic solvents, a special methods for selection of organic solvents should be applied. Solvent screening may be the easiest way of choosing the most appropriate solvent, more sophisticated techniques may include estimation of Hildebrand or Hansen solubility parameters for the fouling matter and choosing the appropriate organic solvent based on the proximity of its respective solubility parameters to that of fouling matter. In case no individual solvent features the target set of solubility parameters, estimates of fouling solubility parameters allow to design special solvent mixes. Specially designed software can be used in the latter case. Washing solution may also contain water, organosoluble surfactants, chelating agents, acids and bases, crown ethers, calixarenes. In some embodiments, the organosoluble surfactant is selected from the group consisting of dialkyl sulfosuccinic acid metal salts, dialkyl sulfosuccinic acid organic salts, alkyl benzenesulfonic acid metal salts, alkyl benzenesulfonic acid organic salts, Silwet-L-5130, and mixtures thereof. Chelating agents, for example, the sodium salts of the polybasic organic acids or the polybasic organic acids themselves, such as EDTA, as well as derivatives of phosphorous acids, such as, NTMP and HEDP, can be used. In some embodiments, the organic solvent selected from the group consisting of a ketone solvent, an ester solvent, an alcohol solvent, an amide solvent, an ether solvent, and mixtures thereof. In some embodiments, an organic and inorganic acid may be included in the washing solution including, but not limited to hydrochloric, sulfuric, nitric, phosphoric, hydrofluoric, acetic, formic, sulfamic, citric, oxalic lactic, methanesulfonic acids. In some embodiments, washing solution for this method may contain sodium hydroxide, sodium carbonate, ammonia or its salts, amines or other organic substances with basic properties/functionality.

Carbonate-Acid Alteration

Carbonate acid alteration cleaning method refers to the consecutive treatment of fouling deposits with carbonate and acid washing solutions applied once or in alternating pattern. Depending on nature of fouling deposits this method can involve two different mechanisms—either ion exchange between carbonate solution and otherwise unreactive fouling deposits or mechanical action of evolving carbon dioxide bubbles.

In first case the method is used exclusively for removing of mineral scales formed by alkaline earth metal sulfates. The method is based on the equilibrium exchange of sulfate and carbonate anions in the surface layer of fouling deposits. Substitution of sulfates with carbonates allows straightforward subsequent dissolution of carbonate-substituted layer in acid washing solution. Since each cycle of the method removes only thin layer of fouling deposits, for thick fouling deposits the method may be relatively time- and material-consuming.

In second case carbonate-acid alteration is used as an alternative to AlfaPEROX method and can be employed for removing of mechanically unstable unreactive fouling such as petcoke deposits. In this case the driving force relies on gas evolution. The inertness of evolving carbon dioxide allows to use the method in the oxygen-sensitive or explosive environments.

Acidic washing solution used for the carbonate acid alteration cleaning method may consist of any acid which is stronger than carbonic acid and can form water-soluble salts with alkaline earth metals, additionally it may contain corrosion inhibitors. Carbonate washing solution can be made of sodium, potassium or ammonium carbonates and may additionally contain surfactants and antifoaming agents.

AlfaPEROX Cleaning Method

AlfaPEROX cleaning method (also called peroxide cleaning method) is unconventional cleaning method combining physical and chemical driving forces. The basis of AlfaPEROX cleaning method is the decomposition of hydrogen peroxide resulting in formation of oxygen bubbles which under the certain conditions can exert enough force to crush and disperse the structure of fouling deposits. Additional benefit of intensive gas evolution may result from flotation effect of gas bubbles which in this way may facilitate the dispersion of hydrophobic particles. Besides the effects related to gas evolution, for certain fouling materials hydrogen peroxide can act an oxidizing agent. Oxidizing of some iron sulfides may result in formation of soluble iron sulphates, a certain organic substances may be also susceptible to oxidation accompanied by solubilization of otherwise insoluble molecules. Increase of local temperature resulted from exothermic decomposition of hydrogen peroxide may also be beneficial for the kinetics of chemical reactions involved in fouling dissolution. The method is effective for dispersion of mechanically unstable fouling deposits and can be the only choice for non-reactive fouling materials. As the major driving force of the AlfaPEROX cleaning method is the expansion of gas bubbles it can be especially effective for the severely fouled equipment with extremely narrow passages such as plate type heat-exchangers; in this case conventional chemical cleaning methods relied on washing solution flow may be ineffective because the liquid flow tends to follow the least resistance paths thereby leaving the most fouled areas unaffected. The washing solution for AlfaPEROX cleaning method may contain premixed hydrogen peroxide as a main active ingredient, but in the majority of cases, hydrogen peroxide is injected separately that is why the washing solution may be considered only as a solvent and a medium for cleaning process. Depending on the specific embodiment, hydrogen peroxide may be injected in circulating or still washing solution, single or multiple injection points located in different parts of circulation loop may be applied. Washing solution may contain catalysts and inhibitors of hydrogen peroxide decomposition (various forms and embodiments of providing such catalysts are covered in the next subsection), alkalis, acids, surfactants, wetting agents, chelating agents, antifoaming agents and organic solvents. The AlfaPEROX cleaning method is described in PCT/RU2017/05005 and PCT/RU2018/050154, both of which are incorporated by reference in their entirety.

Decomposition of Hydrogen Peroxide

Besides the nature of fouling deposits discussed in previous section and the presence of other active ingredients discussed in the respective sections, the efficiency and safety of AlfaPEROX cleaning method depends on the rate and localization of hydrogen peroxide decomposition. Slow rate of hydrogen peroxide decomposition cannot ensure the sufficient amount of oxygen bubbles to be formed and may have no effect on the disintegration of fouling deposits, on the other hand, extremely high rate of decomposition may result in excessive foaming or sharp increase of pressure and damage to the equipment being cleaned. No specific range of rate constant can be assigned to the decomposition reaction to predict its efficiency, as in the real life embodiments of the method many factors affect the outcome of the cleaning, most notably the configuration of the equipment being cleaned and susceptibility of particular fouling deposits. The rate of hydrogen peroxide decomposition increases with temperature, hydrogen peroxide concentration and pH value, but the most significant factor affecting the rate is the presence of catalysts. Under the certain conditions including high pH value (presence of strong alkalis in washing solution) and high temperatures, decomposition of hydrogen peroxide can proceed at a sufficient rate without any catalyst. Under low temperatures and pH values (acid and neutral media) the decomposition of hydrogen peroxide requires some kind of catalyst to proceed. The catalyst should be supplied in an adequate concentration in order to ensure the sufficient rate of decomposition. In theory any substance known for its catalytic activity related to hydrogen peroxide decomposition can be used. Compounds and ions of transition metals, iodide anion and a number of enzymes, including catalase can be used as a catalyst. Selection of a particular catalyst influenced by economic and environmental considerations and by its compatibility with other ingredients of washing solution and construction materials of the equipment to be cleaned. Catalyst can be supplied as a solution or suspension, catalyst also can be generated in situ from precursors thereof. Catalyst can be supplied in washing solution or added/injected separately at any stage of the cleaning process. Catalyst can be added to washing solution once or in any number of portions, catalyst can be added to the buffer vessel or injected in the inlet pipe of the cleaning circuit. In some cases catalyst can be supplied in washing solution from fouling deposits (for example, iron or manganese ions can be leached out by acid from iron oxide deposits) and thus suppling additional catalyst is not required. When needed catalytic activity of metal ion catalysts can be suppressed by addition of chelating agents allowing the means to slow down the process.

Another issue concerning the efficiency of AlfaPEROX cleaning method is the localization of hydrogen peroxide decomposition which can be subdivided in two parts: at a scale of cleaning circuit—it refers to the specific areas of the cleaning circuit volume where the active decomposition of hydrogen peroxide takes place (actually it proceeds at any part of the cleaning circuit where the sufficient concentrations of catalyst and hydrogen peroxide sustained) Obviously the optimal operation mode requires the localization of hydrogen peroxide decomposition inside the equipment to be cleaned, any amount of hydrogen peroxide decomposed in the other areas of cleaning circuit should be considered as wasted. Localization of hydrogen peroxide decomposition at a microscale level refers to the ratio of hydrogen peroxide decomposed directly at the surface or inside the pores of fouling deposits.

In some embodiments, AlfaPEROX cleaning method is characterized that the catalytic decomposition of hydrogen peroxide takes place not only at target areas of equipment to be cleaned but all over the cleaning circuit volume. In some embodiments, the catalyst is encapsulated in soft gas-filled jelly capsules, which can be crushed and emptied in the solution by sharp increase of pressure of washing solution, and can be used to localize the decomposition of hydrogen peroxide. In some embodiments, the catalyst is encapsulated in capsules made of temperature-sensitive material. Modulating the pressure or temperature of washing solution thereby allows to activate the decomposition of hydrogen peroxide at a specific time point or at a specific area of the cleaning circuit. To localize the decomposition of hydrogen peroxide on the surface of fouling deposits special catalysts which has high affinity for the fouling deposit material and thus can be adsorbed at the surface of these deposits are required.

Oxidative Flushing

Oxidative flushing refers to the chemical cleaning method relying on oxidation of fouling material as a main driving force behind the dissolution of fouling deposits. Oxidative flushing may be applied to fouling deposits susceptible to liquid phase oxidation associated with formation of water-soluble products, most notably it is applicable for removal of iron sulfides and certain types of unsaturated organic compounds. Oxidative flushing is the only choice when it comes to removal of pyrophoric residues, this specific case is referred to as decontamination. Washing solution for oxidative flushing contains strong oxidizer as a main active is especially prominent for combinations of non-polar organic solvents with water-based washing solutions. The need for consecutive application of different chemical cleaning methods results from heterogeneity of commonly found fouling deposits so as each method serves to remove a specific fraction of the fouling. Alternatively certain combinations may rely on chemical transformation of fouling material in the first stage making it susceptible to specific kind of treatment in the second stage. Table 2 lists examples of cleaning method combinations according to aspects of the subject technology.

TABLE 2

Chemical cleaning methods for various deposits

| Fouling deposits composition | Efficient combination of consecutively applied chemical cleaning methods |
|---|---|
| Calcium sulphate mixed with iron oxides | Chelate flushing + acid flushing |
| Mineral scales or iron oxides/sulfides covered with a hydrophobic layer (the case is common for the equipment handling oil or other petrochemicals) | Organic solvent flushing + acid/chelate flushing |
| Organic polymers/oligomers and elemental carbon | Organic solvent flushing + AlfaPEROX |
| Mixtures of different iron sulfides with iron oxides | Acid flushing + oxidative flushing |
|  | Acid flushing + chelate flushing |
| Heavy oil deposits/asphaltenes and elemental carbon/carboids | Organic solvent flushing + AlfaPEROX |
|  | Organic solvent flushing + surfactant flushing |
| Organic polymers/oligomers and iron oxides/hardness salts | Organic solvent flushing + acid flushing |
| Organic polymers/oligomers and calcium sulfate | Organic solvent flushing + chelate flushing | ingredient. Hydrogen peroxide, potassium permanganate, sodium hypochlorite, nitric acid, potassium dichromate and other strong oxidizers can be used. Washing solution may also contain acids, bases, chelating agents, surfactants, wetting agents, corrosion inhibitors. In some embodiments, the surfactant is selected from the group consisting of dialkyl sulfosuccinic acid metal salts, dialkyl sulfosuccinic acid organic salts, alkyl benzenesulfonic acid metal salts, alkyl benzenesulfonic acid organic salts, Silwet-L-5130, and mixtures thereof. Chelating agents, for example, the sodium salts of the polybasic organic acids or the polybasic organic acids themselves, such as EDTA, as well as derivatives of phosphorous acids, such as, NTMP and HEDP, can be used. In some embodiments, an organic and inorganic acid may be included in the washing solution including, but not limited to hydrochloric, sulfuric, nitric, phosphoric, hydrofluoric, acetic, formic, sulfamic, citric, oxalic lactic, methanesulfonic acids. In some embodiments, washing solution for this method may contain sodium hydroxide, sodium carbonate, ammonia or its salts, amines or other organic substances with basic properties/functionality. In some embodiments, the corrosion inhibitor is selected from the group consisting of hexamine, phenylenediamine, benzotriazole, dimethylethanolamine, and mixtures thereof. In some embodiments, the wetting agent is selected from the group consisting of glycerin, 3-butanediol, triethylene glycol, 1,6-hexanediol, propylene glycol, 1,5-pentanediol, diethylene glycol, dipropylene glycol, trimethylol propane, trimethylol ethane, and mixtures thereof.

Combinations of Chemical Cleaning Methods

This section addresses the combinations of basic chemical cleaning methods applied consecutively. The combination of active ingredients related to different cleaning methods in one washing solution is not always possible and possess the combined efficiency of its individual components, the case Enhanced Chemical Cleaning Methods Enhanced chemical cleaning refers to the simultaneous employment of basic chemical cleaning methods with various physical treatments applied to washing solution. Such physical treatments may include pulsations and changes in the direction of solution flow; gas injection, ultrasonication; using the scrubbing effect of solid bodies delivered with washing solution (micropigging); cooling of washing solution to subzero temperatures; heating and simmering/boiling of washing solution. Enhancing of chemical cleaning methods with physical treatments may result in dramatic increase of its efficiency, synergy may be explained by multiplying effect of newly formed cracks and ruptures in fouling which increase the surface factor in reaction kinetics. Temperature and ultrasound are known to directly affect the rate of chemical reactions. Under the appropriate conditions and provided the required set-up is installed, a number of enhancement cleaning methods can be applied simultaneously. Enhanced methods are especially effective for mechanically unstable fouling. Specific physical treatments and their applications are discussed in the following sections.

Flow Distortion

Flow distortion refers to the group of enhancement methods based on the effects of cavitation, unsteady flow regime and mild hydraulic shocks resulting from rapid changes of flow velocity and direction. Unsteady flow may be efficient for detaching of relatively large chunks of fouling deposits, repeated hydraulic shocks may cause fractures in the fouling material and cavitation may increase the cleaning efficiency at a microscale level. Repeated rapid changes of flow velocity and direction could be evoked by installing of special mechanical devises in a circulation loop. Downsides of the method is the need for using of special devices and the elevated risk of mechanical equipment failure caused by hydraulic shocks.

Gas Injection

Gas injection refers to the group of enhancement methods based on the flotation and disruption effects of evolving gas bubbles. These methods should be distinguished from pure chemical means of bubble generation covered in the respective sections of chemical cleaning methods. Sufficient amount of injected gas may cause the flow distortion and the associated effects covered in previous section. Compressed air, nitrogen or carbon dioxide can be used as a source of gas bubbles. The embodiments of the method include simple injection of pressurized gas in the inlet section of circulation loop or using of separate pressurized chamber to dissolve the gas in washing solution and passing it through a throttle installed in the inlet part of the loop to allow the pressure drop and release of dissolved gas in the equipment cavity. The later embodiment allows better delivery of bubbles to the surface of fouling deposits which than serves as a nucleation site for oversaturated gas solution. Another embodiment may rely on the compressed air/nitrogen line installed at the bottom section of the equipment cavity. Downsides of the method are the need for gas supply, more intricate set-up of the circulation loop and possible complications resulted from excessive foaming and gas-bounding of centrifugal pumps (the gas-bounding of centrifugal pumps is a common issue for all cleaning methods involving the evolution of gas in washing solution).

Micropigging

Micropigging refers to cleaning practices using various solid objects, delivered with washing solution, to scrub the inner surface of the equipment. While using of traditional pigs (A pig in the pipeline industry refers to a specially designed tool that is sent down a pipeline and propelled by the pressure of the product flow in the pipeline in a similar way as a piston) is limited to large-diameter transportation pipes, micropigging can be used universally provided that size and shape of selected objects and the washing solution rate flow allow them to pass the narrow areas of equipment cavity. The objects used for micropigging (hereinafter referred to as pigs) can be made of hard solid materials or soft elastic polymers which allow a certain deformation of a pig; a specific embodiment of the method called ice-pigging utilizes the small particles of ice delivered with a specially formulated ice-water slurry. Potential cleaning efficiency of the solid pig depends on its ability to scrub out the particles of the fouling material, therefore the solid pigs may be designed in various shapes featuring sharp edges and/or barbs to focus the exerted pressure (in case of elastic fouling deposits barbed pigs are unlikely to scrub particles of the fouling material but still they may leave scratches on its surface which in turn increase the surface area and facilitate the diffusion of washing solution inside the deposits). Soft elastic pigs are efficient for removing of fouling from narrow passages such as tubes of shell-and-tube heat-exchanger where they can be squeezed inside and propelled by washing solution flow like the traditional macroscale pigs. It is most practical to make the elastic pigs of spherical shape to fit the cross-section of the tubes. Whereas the efficiency of all pig types is strongly dependent on its kinetic energy related to the solution flow rate, the efficiency of elastic pigs is especially dependent on the solution rate flow coupled with optimal level of pig's elasticity which allow to sustain steady contact with a tube wall while at the same time minimizing the risk of tube plugging; this fact makes critical the selection of soft pig size. A specific embodiment of the method is a spherical elastic pigs made of polymer foam and feature a surface with hard protrusions or metal inclusions designed to boost the scrubbing effect. Drawbacks of the micropigging method include:
- practical impossibility of sustaining sufficient flow rate in all affected areas of the equipment and related risks of plugging and pig deposition in the «dead» areas of the equipment cavity;
- technical complications related to pumping the pigged solution in its delivery to the equipment. Specially designed pig traps and injectors may be used.

Regarding the using of micropigging as an enhancement for basic chemical cleaning method the following issues should be addressed:
- expected efficiency of the scrubbing effect assessed on the basis of fouling hardness
- compatibility of pig material with washing solution;
- the ratio of pig density and the specific gravity of washing solution.

Provided all other conditions are favorable, the micropigging enhancement is effective on the fouling deposits featuring hardness value lower than that of pigs (with the exception of using soft pigs for shell-and-tube heat-exchangers). In order to facilitate the uniform distribution of pigs in washing solution and minimize the risks of pig deposition in the equipment overall density of the pigs should be slightly higher than that of washing solution. Except for special embodiments discussed below, the pigs should be compatible with washing solution in terms of the solubility and corrosion rate.

Specific embodiments of the micropigging related to its use in chemical cleaning include using of particulate matter in form of monocrystals, flakes, granules, metal shavings etc., which can acts as pigs and after a certain time be dissolved in washing solution. Another specific embodiment may involve actual pigs of any specific shape intended to be dissolved in washing solution. Depending on the specific embodiment the dissolution of disposable pigs in the washing solution may proceed either gradually along the normal circulation cycle or be triggered by specific factors such as the change in washing solution composition or temperature (or complete replacement of washing solution). Disposable pigs may be made of active ingredients including the gas-producing substances, metal shavings dissolving in acidic medium may be used to produce the reductive environment within the washing solution. Using of disposable pigs lacks the risks of plugging and pig deposition in the equipment and allows to incorporate the physical enhancement method into a plot of on-site preparation and customization of washing solution.

Ultrasonication

Ultrasonication refers to various enhancement technics using ultrasound vibrations to destroy the fouling deposits, detach them form equipment surface and intensify the chemical reactions in the washing solution. Various embodiments of the method differ in the specific position of ultrasound transducers in the circulation loop, the transducers can be placed on the inlet of equipment cavity, on the different sites of the external wall of the equipment cavity or they can be put inside the equipment cavity. The transducers may also vary in number, and frequency of the ultrasound produced. Special embodiment of ultrasonication treatment relied on exciting of resonance vibrations in the equipment casing are currently branded as hydrokinetics.

Heating

Heating of washing solution can be used to boost the rate of chemical reactions between active ingredients and fouling material as well as increase the solubility of fouling materials/active ingredients/reaction products. Additional benefits of elevated temperatures which may contribute to increased efficiency include lower viscosity and surface tension of washing solution which allows better wetting and soaking of fouling deposits. For some thermoplastic fouling materials elevated temperatures may result in liquification. Besides the few exceptions (most notably dissolution of calcium sulphate scales) cleaning efficiency is proportional to washing solution temperature for all types of fouling deposits. Downsides of heating include increased corrosivity of acidic and alkaline washing solutions and increased vapor pressure of organic solvents which may pose potential health and fire risks. Energy for heating of the solution can be supplied by electric heaters installed in the buffer vessel or by heating medium delivered in the opposite contour of the heat-exchanger being cleaned. In a specific embodiment of the enhanced acid flushing method, thermal energy for heating may be provided by dosing of concentrated sulfuric acid in water-based washing solution. Other exothermic chemical reactions can be used as well.

Simmering & Boiling

Simmering of washing solution refers to heating of washing solution being inside the equipment slightly above its boiling point. Such treatment may be used exclusively for heat-exchange equipment which allow simultaneous circulation of washing solution and heating medium in the opposite contours of the same equipment unit. Heating medium in this case refers to the hot liquid or steam supplied in the contour opposite to one that is cleaned. Simmering of washing solution is even more efficient than heating as, while preserving all benefits of elevated temperatures discussed in previous section, it also involves mechanical action of evolving vapor bubbles similar to that of oxygen bubbles in AlfaPEROX method. Moreover, if fouling deposits are somewhat penetrable for washing solution, simmering allows to concentrate the action of vapor bubbles on fouling layer directly adjacent to heat transfer surfaces as these are the parts of the equipment by which thermal energy is delivered to washing solution. Concentration of vapor pressure under the fouling deposits which also serve as nucleation site for bubbles allows it to split and detach a relatively large chunks of fouling material significantly reducing the processing time. Downsides of the method include more intricate set-up, a need for a power source to supply the heating medium and multiple technical complications resulting from dealing with boiling washing solution. Suitable washing solution for simmering enhancement method should contain at least one low-boiling organic solvent, preferably dichloromethane, it may also contain organosoluble surfactants, oxidizers etc. Heating medium can be represented by steam, hot water, glycol-based water solutions or special heat-transfer oils. In a certain specific embodiment of the method the same dichloromethane-based washing solution circulating in sealed opposite contour under elevated pressure can act as heating medium. In this case pressurizing of used washing solution allows simple swapping of contours to be cleaned and to be used for power supply. Another specific embodiment of the method may use flash boiling triggered by sharp drop in pressure of slightly overheated washing solution—in this particular case sharp increase of vapor volume inside the equipment cavity may result in detachment and expulsion of relatively large chunks of fouling material Condenser can be used at the outlet of the equipment contour to prevent release of solvent vapors to atmosphere.

Cooling

Cooling of washing solution can be used exclusively to cool down the elastic fouling materials below its glass transition point. Respective phase transition is known to dramatically reduce the plasticity of polymeric materials and render them susceptible to mechanical stress. Additional driving force for detachment of fouling material may result from difference in thermal expansion coefficients between fouling and equipment construction material. The method can be used in combination with other enhancement techniques such as a micropigging and ultrasonication. The ice-pigging discussed above can be regarded as such combination. The low glass transition points of many polymers require the using of special formulations: the washing solution may be represented by known cooling mixtures (such as water solutions or ice-water slurries of calcium chloride or ammonium nitrate) or contain the mixes of liquid nitrogen or solid carbon dioxide with organic solvents. In this case no additional setup for cooling of washing solution is required as the temperature drops spontaneously due to endothermic reactions or inherent low temperatures of the components. Another specific embodiment may include using of specially designed cooling section in the thermo-insulated circulation loop. Still another embodiment may comprise spraying of liquid nitrogen or a mixtures thereof on dismantled tube bundles. Combination of tube diameter contraction, glassification of fouling material and expansion of boiling nitrogen inside the resulted cracks may effectively detach the fouling deposits form tube's surface.

Pretreatments

Pretreatment refers to the mechanical or physical treatments applied to fouling deposits before the actual use of chemical cleaning method. Using of pretreatments allows to enable or facilitate the delivery of washing solution inside the hard-to-reach areas of the equipment (most notably fully plugged tubes of shell-and-tube heat-exchangers) or/and the structure of fouling deposits.

Hydro-Jetting

Hydro-jetting refers to the using of high-pressure water jets to destroy and disperse the fouling deposits, hydro-jetting is the only choice to enable passage of the washing solution through the fully plugged tubes of shell-and-tube heat-exchangers, without such pretreatment none of the chemical cleaning methods can yield sufficient results in a reasonable time limit. Hydro-jetting can also be used on the shell-side to facilitate the circulation of washing solution through severely fouled tube-bundles. Specific embodiment of the hydro-jetting may include using of washing solutions instead of water, in certain cases all cleaning operations may be limited to such treatment.

Steaming

Steaming refers to the various technics of using steam flow to deliver thermal energy and hot water to the internal surfaces of the equipment cavity. In the simplest case steam flow may be used as a pretreatment to heat and moisten the fouling deposits and evoke mechanical distortion of fouling material associated with thermal stress and physicochemical changes resulting from interaction with hot steam. Another technic makes use of air-steam mixture which can chemically interact with carbonaceous fouling resulting in gaseous products. Still another technic employs flash injections of high-velocity steam inside the working furnace coil. Most notably such pretreatments proved to be effective for removing of coke deposits from oil refinery furnace coils and delayed cocker units and respectively referred to as air-steam decoking and on-line spalling. Steam flow may also be used as a carrier medium to deliver active ingredients used in chemical cleaning, that is usually achieved by injection of washing solution into turbulent steam flow at the inlet of the equipment. Resulting microdroplets of washing solution are effectively delivered all over the internal surface of the equipment and allow to apply chemical cleaning methods to a large equipment units where employment of circulation-loop embodiment may require significant volumes of washing solution. Therefore steaming with washing solution injections may be as well considered as a specific embodiment of enhanced chemical cleaning method.

Selecting the particular cleaning recipe including the chemical composition of the cleaning solution, the selection and ordering of multiple cleaning steps, and the durations of the cleaning steps may be based on data captured based on testing fouling samples different chemical compositions for different duration, based on simulated results according to the properties of the chemical solutions and the fouling deposits, etc.

Online Control

Online control of the cleaning process refers to the specific predetermined set of measures related to the accurate identification of cleaning end point as well as real-time dynamics of the cleanup process. Cleanup process refers to the active stage of the equipment cleaning i.e. the actual application of the washing solution to the specific equipment in a specific embodiment. The data collected during online control of heat-exchanger cleaning is also used as an input data for the individual heat exchanger profile and the related predictive analysis.

Depending on the specific case, online control may include the measurements of the following dynamics:
- gauge pressure gradient between the inlet and outlet of the equipment being cleaned;
- the level of washing solution in the buffer vessel (the change of its level may correspond to the change in free volume of the equipment which in turn is related to the amount of dissolved fouling deposits;
- specific gravity, pH, optical transmittance, turbidity, electric conductivity, refraction index, radioactivity and other physical properties of the washing solution related to the concentration of fouling matter;
- concentrations of the specific marker substances or ions reflecting the dynamics of active ingredient depletion, accumulation of specific fouling materials or overall progress of cleaning.

The duration of methods and technics used to obtain the abovementioned data should be short enough to enable operative adjustments and halting of the cleanup process.

Once a saturation point is achieved, than, depending on expectations from individual heat exchanger profile coupled with forecasted cleaning efficiency, either the cleanup process is completed or the washing solution should be replaced due to depletion of an active ingredients. In certain cases, the optimal duration of the cleanup process based on the predictive analysis and/or kinetics studies may be lower than that required for the achievement of saturation point according to online control measurements—this means that the cleanup process should be completed or the cleaning solution should be replaced at a certain optimal level of controlled parameter even before the saturation level is achieved.

Whenever it is possible collection of fouling samples before, during and after the cleanup process should be implemented, as the accurate digitalization of fouling composition data allows to narrow the uncertainty in cleanup parameters based on predictive analysis.

Corrosion Issues

Since corrosion of the equipment pose a serious safety and reliability risks it should be thoroughly assessed both before and after the actual cleanup process. Corrosion risk management in relation to the specific equipment unit subjected to chemical cleaning includes the following operations:
- identification of construction materials used in the equipment
- identification of special areas featuring elevated corrosion risks like butt welds
- identification of galvanic couples that could arise under cleaning conditions
- collection of data related to the operational and maintenance history of the unit
- identification of the acceptable risk levels (expressed in terms of uniformed corrosion rate and others numerical values)
- development of the appropriate washing solution(s) taking into account corrosion risks considerations
- corrosion testing of equipment construction materials in the selected washing solution(s) in the presence of actual fouling deposits at a designated temperatures, the types of the corrosion that must be assessed should be based on the specific types of corrosion characteristics of the concerned materials
- online control of actual uniformed corrosion rate using coupons placed in the circulation loop.

Operating Costs

Returning to FIG. 2, based on the selected cleaning recipe and the fouling function, operating costs associated with executing a cleaning process at multiple according to multiple different cleaning schedules are determined (block S204).

The determined fouling function may be used to produce a Fouling Level Forecast (FLF), together with the properties of the fouling material and production plan for operating the process. The FLF provides an outlook to a future state of the PHT and its operational characteristics, focusing future fouling situation and its impact over production efficiency.

In order to build an accurate Fouling Level Forecast historical climate data and climate forecasts may be incorporated since the fouling function may react to outside temperature. Fouling Level Forecast accuracy also may depend on the methods used to produce the Fouling Level Estimate and Fouling Characterization.

According to aspects of the subject technology, two methods may be used to produce FLF: (i) Regression analysis, which is a set of statistical processes for estimating relationship between dependent variable (fouling level) and independent variables; and (ii) an Artificial Neural Network (ANN), a method for providing output (fouling level) given historical outputs and inputs without being programmed. In cases when there is a lot of data available, the ANN may generate better results than the regression analysis. However, the weights inside of ANN may be unable to be interpreted. On the other hand, regression analysis may deliver more interpretable results and can be applied when there is shortage of data for analysis. The cognitive cleaning framework may be implemented regardless of the method used, though testing may be done to compare both methods to identify preferable results. The ANN method has a long-term advantage, since it learns from the previous implementations and is not human-biased.

The Fouling Level Forecast may be regularly updated with more data to come and used for making provisional decision-making in procurement, economic evaluation and recipe planning. Actual data may be cross-checked against the forecast at times of review. Large discrepancies should be evaluated, and anomalies should be explained and based on the finding the models get updated.

There are several different types of FLF reviews within the Cognitive Cleaning Framework, depending on their functional role: Weekly forecast; Monthly forecast; Quarterly forecast; and Annual forecast. Weekly forecasting reviews may be used for tracking weekly changes of the fouling plan/actuals to ensure PHT units operate. Monthly, Quarterly and Annual forecasting may be used for budgeting purposes translating fouling level forecasts in terms of costs and time within the Smart Scheduling process.

Cost Outlook

A Cost Outlook associated with the operation of the PHT may be an actualization of the economic parameters and include actual PHT running costs, cleaning process costs, as well as reductions in costs due to improved efficiency in energy usage, emission monetization, etc. The Cost Outlook may be prepared based on the monthly, quarterly and annual Fouling Level Forecasts, open source data which provides access to analytical reports on the current and future economy state, or data procured from the specialized consulting firms.

For the purposes of the Cognitive Cleaning framework the Cost Outlook may provide at least the following information:

Price of fuel used in the plant;
Volume of fuel to be used (based on the production plans and Fouling Level Forecast);
Weighted running costs of PHT units (relative weights are calculated as a unit heat exchanger surface to total PHT surface); and
Cleaning costs expressed in terms of labor, chemicals, duration, indicating the need to disassemble the PHT units.

The Cognitive Cleaning Framework may keep the Cost Outlook up-to-date and as accurate as possible to improve performance. The Cost Outlook may use existing contract arrangements. The Cost Outlook results may include economic and environmental costs of running PHT in various scenarios.

Cleaning Schedules

Operating the industrial process may be simulated using different schedules for executing cleaning processes using the selected cleaning recipe. The simulations may be performed using the determined cost outlook and the fouling level forecast. The schedules may have different intervals for executing the cleaning processes. The intervals may be a number of days, a number of weeks, a number of months, or some other time interval.

For each simulation run, a net effect on the costs associated with operating the industrial process and executing the cleaning process according to one of the schedules is determined. In addition to the cost outlook outlined above, the net effect also may take into account improved heat energy recuperation, $CO_2$ emissions monetization, duty reduction in pumps used in the PHT, and improvements in production profiles resulting from executing the cleaning process according to the schedule. For example, improving the efficiency of the industrial process may reduce the consumption of fuel and thereby reduce $CO_2$ emissions. This reduction may be able to be monetized in the carbon emission allowance market either by reducing the number of carbon emission credits that are purchased or allowing the sale of unused carbon emission credits.

Figure 9:
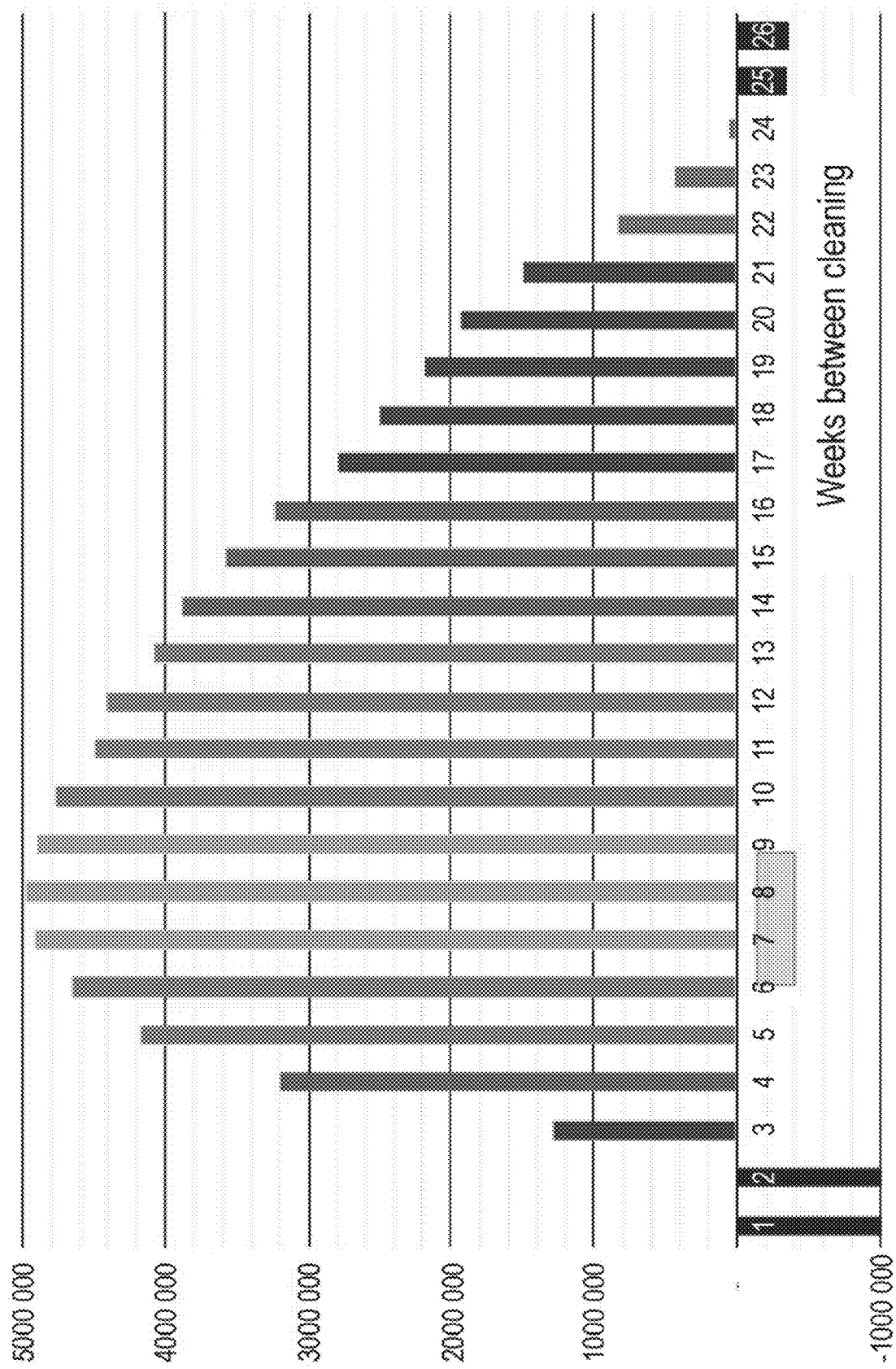
FIG. 9 is a chart illustrating net effects of different cleaning intervals according to aspects of the subject technology.

FIG. 9 is a graph illustrating the net effect in US dollars on operation costs using cleaning schedules having intervals varying from 1 week up to 26 weeks. As noted above, the subject technology is not limited to week intervals and may use intervals of other types. According to aspects of the subject technology, a maximum cleaning interval may be determined based on characteristics of the fouling deposits. For example, aging of the fouling deposits may increase the complexity of the deposits, as represented in FIG. 8. Depending on the properties of the surfaces within the HEX where the deposits are formed, certain complexities may be difficult to remove or may damage the surfaces within the HEX. For example, based on the fouling function and aging properties, fouling deposits after 26 weeks may damage the surfaces of the HEX and therefore a maximum interval of 26 weeks may be used for the simulations.

Figure 10:
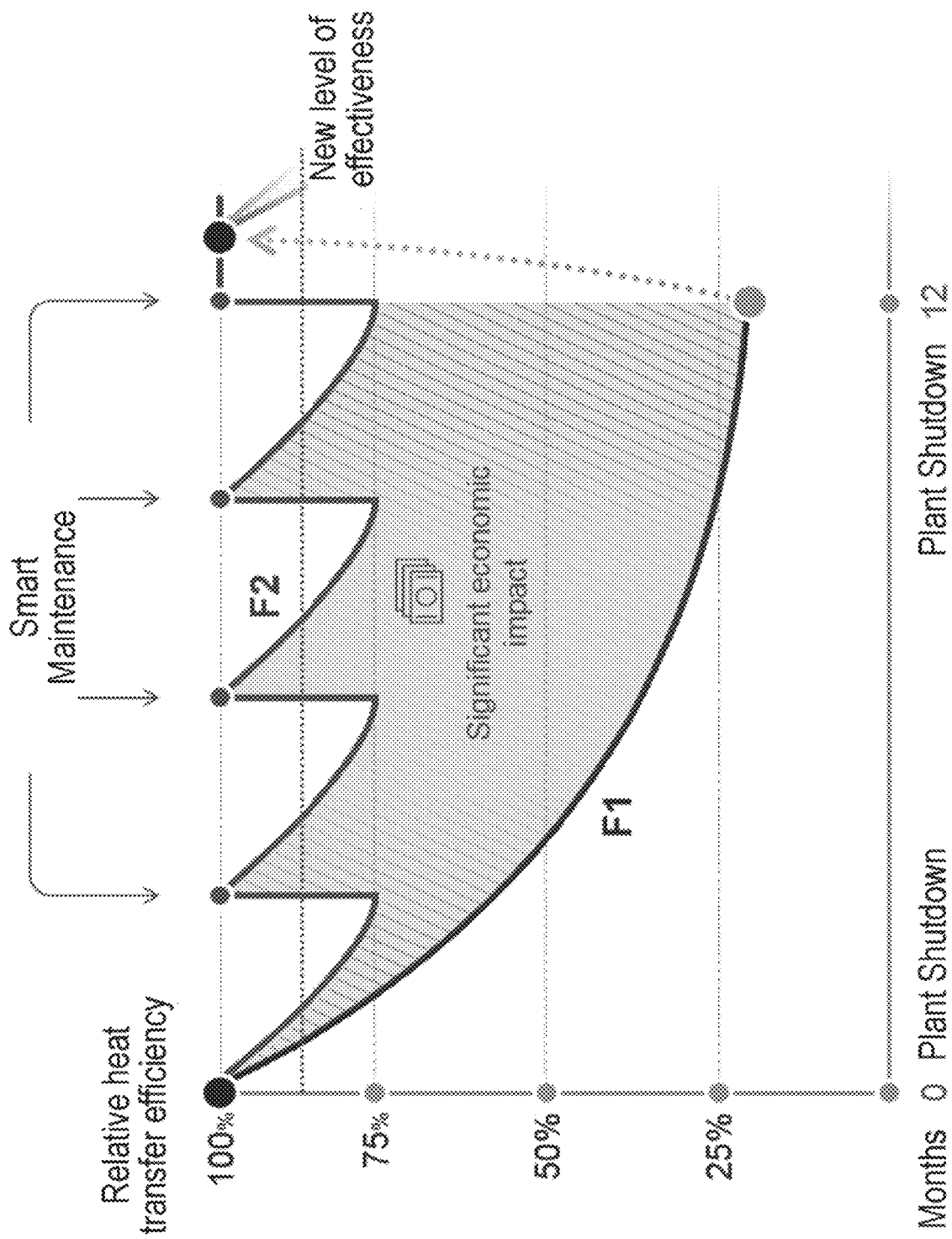
FIG. 10 is a graph illustrating economic impact of a cleaning schedule according to aspects of the subject technology.

As depicted in FIG. 9, the net effect of using intervals of 1 week, 2 weeks, 25 weeks, or 26 weeks is negative on the operating costs. Alternatively, intervals of 7 weeks, 8 weeks, or 9 weeks have the highest positive net effect, with 8 weeks being the highest. Returning to FIG. 2, a cleaning schedule having an 8 week interval may be selected (block S206). FIG. 10 is a graph depicting another representation of the positive net effect of using the selected cleaning schedule as part of a smart maintenance operation of the PHT.

The selected cleaning recipe and cleaning schedules may be part of a Personalized Cleaning Profile (PCP) used in simulating the net effect on operating costs. The Personalized Cleaning Profile may model the PHT cleaning in the actual ambient environment, using all available information, including sensor data from an IoT platform.

The PCP may be deployed in an online or offline mode, namely, with real-time or modeled data. Indications from virtual dashboards may be compared to actual sensor data to identify and evaluate possible anomalies. The PCP allows modeling of cleaning scenarios by combining various parameters of the fouling function and fouling characteristics with a corresponding Cost Outlook to produce boundary conditions, fouling-related penalties in terms of costs and environment impact and others.

In some practical cases, since fouling function is not linear, a quick cleaning of PHT unit may be performed when the fouling has started to build up above a certain threshold level defined through PCP. For example, when relative heat transfer efficiency has dropped to 75% as illustrated in the graph of FIG. 10. After such a threshold level is reached the fouling deposit process may accelerate and the fouling may become both more complex and occupy more volume within the PHT units that overcomplicates cleaning process and it correspondingly becomes more expensive. For example, a fouling which blocks fluid flow within PHT tubes makes it impossible for a soft cleaning (a cleaning without PHT Unit disassembly). Such cases may require complex mechanical disassembly of unit and cleaning process which harms the inner surface to PHT unit). The threshold level also may depend on the of heat exchanger reserve surface. When the corresponding PHT reserve surface depletes there arises a risk to run out of reserves. In this case the further cleaning may impact the production as a bypass option becomes invalid. Any time lost for cleaning will mean time lost for production, exponentially growing cost fouling-penalty (which is absolutely not acceptable case for a plant management).

Cleaning Process

Figure 11:
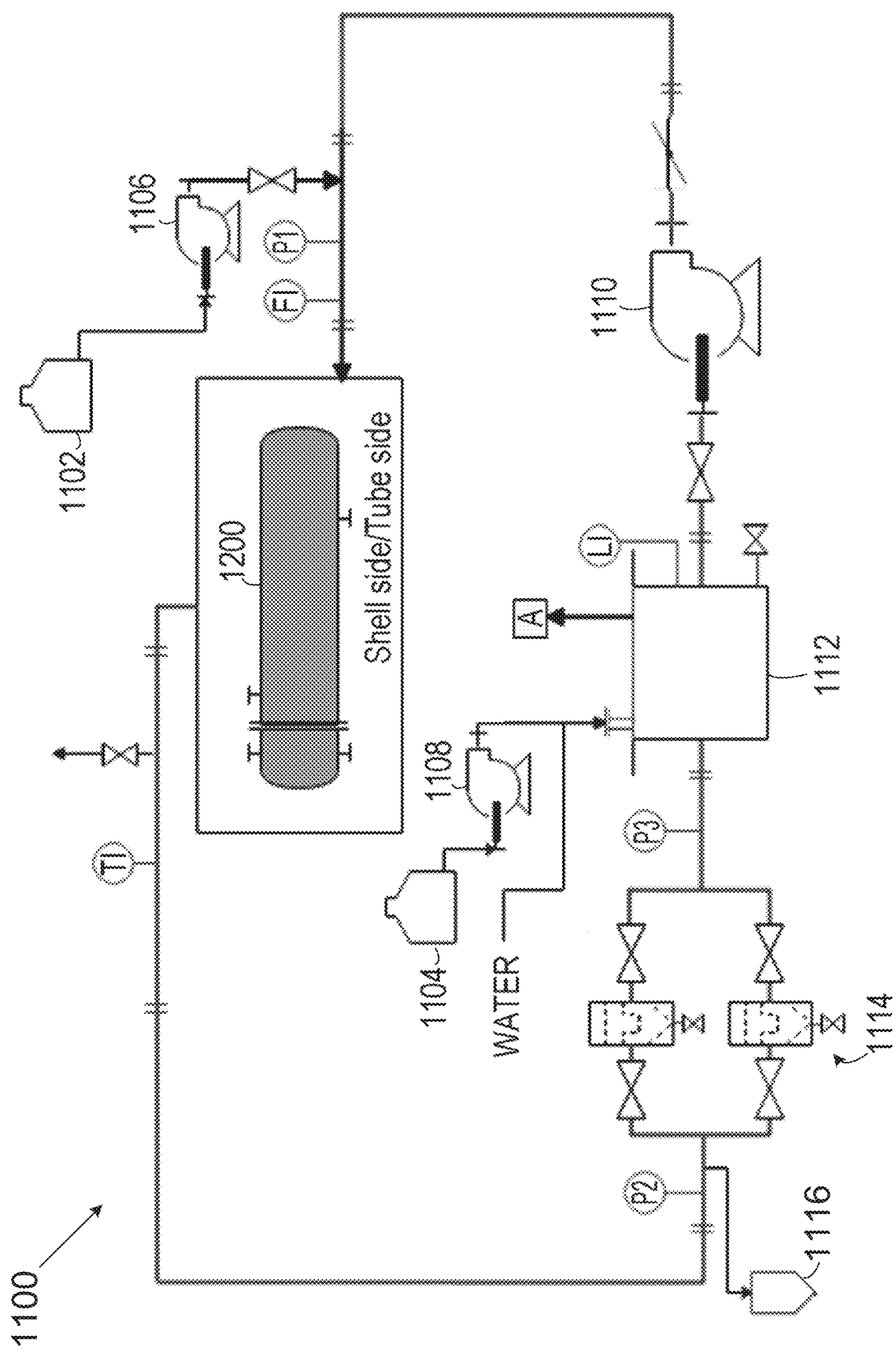
FIG. 11 is a diagram illustrating a cleaning system according to aspects of the subject technology.

Returning to FIG. 2, a cleaning process may be executed on the processing equipment (HEX) according to the selected cleaning schedule using the selected cleaning recipe (block S208). FIG. 11 is a diagram illustrating a cleaning system 1100 for executing the cleaning process according to aspects of the subject technology. The subject technology is not limited to the number or type of components depicted in FIG. 11, nor the arrangement of the components depicted in FIG. 11.

As depicted in FIG. 11, cleaning system 1100 includes tanks 1102 and 1104, pumps 1106, 1108, and 1110, buffer vessel 1112, filter 1114, and drain 1116. The components of cleaning system 1100 may be arranged on a skid that is configurable to be connected to an inlet and an outlet of HEX 1200. The inlet and the outlet may be part of the cold side flow path or the hot side flow path of the HEX. For example, cleaning system 1100 may be connected to the inlet of the shell side and the outlet of the shell side of HEX 1200. The components of cleaning system 1100 may be connected to a control system configured to operate the components to executing a cleaning process according to the selected cleaning recipe and cleaning schedule. The control system may include components such as those depicted in FIG. 12 and execute sequences of instructions to perform the cleaning process using the components of cleaning system 1100.

Tanks 1102 and 1104 may contain chemical compositions used as part of the cleaning recipe. Pump 1106 may be configured to pump the chemical composition stored in tank 1102 directly into the circulation line connected to HEX 1200. Pump 1108 may be configured to pump the chemical composition stored in tank 1104 into buffer vessel 1112 to be diluted with water or another substance supplied into buffer vessel 1112 according to the cleaning recipe. Pump 1110 may be configured to pump the diluted solution from buffer vessel 1112 into the circulation line to circulate the solution through HEX 1200. The circulation line also may pass through filter 1114, which may be configured to capture fouling deposits removed from HEX 1200 by circulating the solution through HEX 1200. Filter 1114 may be a cartridge type filter or another type of filter. Drain 1116 may be configured to be opened to drain the solution from the circulation line.

The foregoing processes may be performed for each HEX in PHT 100 and individual cleaning recipes and cleaning schedules may be selected/determined for each HEX. Alternatively, a common cleaning schedule may be determined for multiple HEXs using the respective cleaning recipes.

The foregoing processes may be repeated either on a predetermined schedule or in response to a change in data. For example, changes in fouling characteristics may require a new cleaning recipe, which may impact the estimates for operating costs. Accordingly, the processes may be repeated in response to determining the fouling characteristics have changed following the analysis of fouling deposits removed during a previous cleaning process. Additionally, economic and environmental factors also may change over time, which impact the operating costs and the net effects of operating the processing equipment. Accordingly, periodic review of the economic and environmental factors that were used during a previous execution of the processes described herein may trigger another round of the processes to reflect the updated information.

Electronic System

Figure 12:
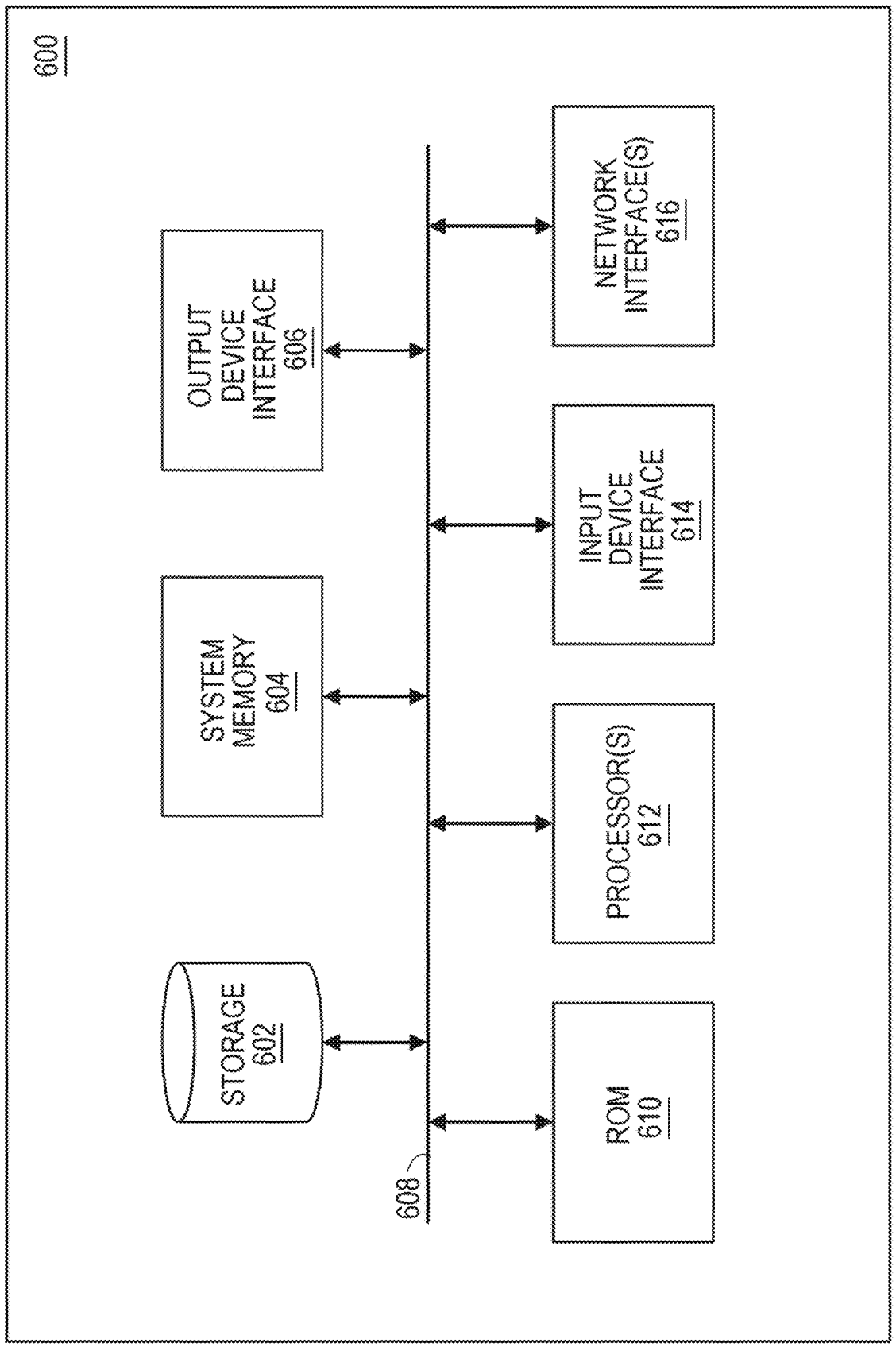
FIG. 12 illustrates an example electronic system with which aspects of the subject technology may be implemented.

FIG. 12 illustrates an electronic system 600 with which one or more implementations of the subject technology may be implemented. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 12, the bus 608 also couples the electronic system 600 to one or more networks and/or to one or more network nodes through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of preceding a series of items, with the term "and" or "or" to separate any of the items, modifies the list as a whole, rather than each member of the list (i.e., each item). The phrase "at least one of does not require selection of at least one of each item listed; rather, the phrase allows a meaning that includes at least one of any one of the items, and/or at least one of any combination of the items, and/or at least one of each of the items. By way of example, the phrases" at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for cleaning processing equipment, comprising:
   generating a function characterizing a relationship between fouling formation in the processing equipment and operation of the processing equipment;
   selecting a cleaning recipe based on properties of fouling material formed in the processing equipment during operation of the processing equipment;
   determining operating costs associated with each of a plurality of cleaning schedules based on the function and the cleaning recipe;
   selecting one of the plurality of cleaning schedules based on the respective determined operating costs; and
   executing a cleaning process on the processing equipment according to the selected cleaning schedule using the selected cleaning recipe, wherein:
   the processing equipment comprises a heat exchanger;
   the method further comprises measuring and recording a temperature of each of a cold side utility entering the heat exchanger, the cold side utility exiting the heat exchanger, a hot side utility entering the heat exchanger, and the hot side utility exiting the heat exchanger; and
   the function is generated based on the recorded temperatures.

2. The method according to claim 1, wherein the function provides an amount of fouling material per unit area formed as a function of operating days of the processing equipment.

3. The method according to claim 1, wherein the cleaning recipe comprises a composition of a cleaning material circulated through the processing equipment during the cleaning process and a duration of circulating the cleaning material through the processing equipment.

4. The method according to claim 1, wherein the cleaning recipe comprises a plurality of cleaning materials and a respective plurality of durations of circulating the respective cleaning materials through the processing equipment.

5. The method according to claim 4, wherein the plurality of cleaning materials includes a first cleaning material and a second cleaning material different from the first cleaning material.

6. The method according to claim 4, wherein the plurality of durations comprises a first duration and a second duration different from the first duration.

7. The method according to claim 1, further comprising analyzing a sample of the fouling material to determine the properties of the fouling material, wherein the properties of the fouling material include chemical composition, density, and thermal conductivity of the fouling material.

8. The method according to claim 1, wherein the operating costs further comprise monetization of emission reductions due to operating and cleaning the processing equipment according to the selected cleaning schedule.

9. The method according to claim 8, wherein the operating costs comprise costs of executing the cleaning process and costs of operating the processing equipment at fouling levels determined based on the generated function.

10. The method according to claim 1, wherein the plurality of cleaning schedules comprises a first cleaning schedule having a first cleaning interval and a second cleaning schedule having a second cleaning interval different from the first cleaning interval.

11. The method according to claim 10, wherein the plurality of cleaning schedules includes a maximum cleaning interval determined based on the properties of the fouling material.

12. The method according to claim 1, wherein the processing equipment comprises a plurality of components, and wherein the method further comprises, for each of the plurality of components:
   generating a function characterizing a relationship between fouling formation in the processing equipment and operation of the processing equipment;
   selecting a cleaning recipe based on properties of fouling material formed in the processing equipment during operation of the processing equipment;
   determining operating costs associated with each of a plurality of cleaning schedules based on the function and the cleaning recipe; and
   selecting one of the plurality of cleaning schedules based on the respective determined operating costs.

13. The method according to claim 1, further comprising:
   removing a sample of the fouling material from the processing equipment in association with the executed cleaning process; and
   repeating the steps of generating the function, selecting the cleaning recipe, determining the operating costs, and selecting one of the plurality of cleaning schedules.

14. The method according to claim 1, wherein determining the operating costs associated with each of the plurality of cleaning schedules comprises executing simulations of operating the processing equipment.

15. The method according to claim 1, wherein the operating costs comprise costs of executing the cleaning process and costs of operating the processing equipment at fouling levels determined based on the generated function.

\* \* \* \* \*